US010699198B2

(12) United States Patent
Somekh et al.

(10) Patent No.: US 10,699,198 B2
(45) Date of Patent: Jun. 30, 2020

(54) METHOD AND SYSTEM FOR COLD-START ITEM RECOMMENDATION

(71) Applicant: Yahoo Holdings, Inc., Sunnyvale, CA (US)

(72) Inventors: Oren Shlomo Somekh, Bet-Yehoshua (IL); Shahar Golan, Haifa (IL); Nadav Golbandi, Haifa (IL); Zohar Karnin, Herzelia (IL); Oleg Rokhlenko, Haifa (IL); Oren Anava, Haifa (IL); Ronny Lempel, Zichron Yaakov (IL)

(73) Assignee: Oath Inc., New York, NY (US)

( * ) Notice: Subject to any disclaimer, the term of this patent is extended or adjusted under 35 U.S.C. 154(b) by 565 days.

(21) Appl. No.: 14/519,273

(22) Filed: Oct. 21, 2014

(65) Prior Publication Data

US 2016/0110646 A1    Apr. 21, 2016

(51) Int. Cl.
| | | |
|---|---|---|
| *G06F 17/00* | (2019.01) | |
| *G06N 5/02* | (2006.01) | |
| *G06N 5/04* | (2006.01) | |
| *G06Q 30/06* | (2012.01) | |
| *G06N 7/00* | (2006.01) | |
| *G06N 20/00* | (2019.01) | |

(52) U.S. Cl.
CPC ............. *G06N 5/04* (2013.01); *G06N 7/005* (2013.01); *G06N 20/00* (2019.01); *G06Q 30/0631* (2013.01)

(58) Field of Classification Search
CPC .... G06N 99/005; G06N 3/0454; G06N 3/063; G06N 3/02; G06N 3/049; G06N 3/10; G06N 5/02; G06N 3/04; G06N 3/08; G06N 5/04; G06N 5/025; G06Q 30/02; G06Q 30/0203; G06Q 30/0269; G06Q 50/01

See application file for complete search history.

(56) References Cited

U.S. PATENT DOCUMENTS 8,301,692 B1 * 10/2012 Hamaker ........... G06Q 30/0631
705/26.7
2003/0236734 A1 * 12/2003 Guler .................. G06Q 10/067
705/37

(Continued)

OTHER PUBLICATIONS

"An Efficient Neighbourhood Estimation Technique for Making Recommendations" Li_tung Weng et al Springer-Verlag Berlin Heidelberg 2009 (Year: 2009).*

(Continued)

*Primary Examiner* — Luis A Sitiriche
(74) *Attorney, Agent, or Firm* — Pillsbury Winthrop Shaw Pittman LLP

(57) ABSTRACT

Method, system, and programs for estimating interests of a plurality of users with respect to a new piece of information are disclosed. In one example, historical interests of the plurality of users are obtained with respect to one or more existing pieces of information. One or more users are selected from the plurality of users. Historical interests of the one or more users can minimize an objective function over the plurality of users. Interests of the one or more users are obtained with respect to the new piece of information. Estimated interests of the plurality of users are generated with respect to the new piece of information based on the obtained interests of the one or more users.

20 Claims, 24 Drawing Sheets

(56) References Cited

U.S. PATENT DOCUMENTS

2006/0074830 A1* 4/2006 Mojsilovic ........... G06K 9/6282
                                                    706/45
2010/0250556 A1* 9/2010 Park ................. G06F 17/30699
                                                    707/749
2011/0112981 A1* 5/2011 Park ................. G06F 17/30867
                                                    705/347

OTHER PUBLICATIONS

Arkadiusz Paterek, Improving regularized singular value decomposition for collaborative filtering, KDDCup.07 Aug. 12, 2007, San Jose, California, USA.
Yehuda Koren, Factorization Meets the Neighborhood: a Multifaceted Collaborative Filtering Model, KDD'08, Aug. 24-27, 2008, Las Vegas, Nevada, USA.
Natalie Aizenberg, Build Your Own Music Recommender by Modeling Internet Radio Streams, International World Wide Web Conference Committee, (IW3C2), '2012 Lyon, France.
Michal Aharon, Dynamic Personalized Recommendation of Comment-Eliciting Stories, RecSys'12, Sep. 9-13, 2012, Dublin, Ireland.

* cited by examiner

METHOD AND SYSTEM FOR COLD-START ITEM RECOMMENDATION

TECHNICAL FIELD

The present teaching relates to methods, systems and programming for estimating user interests. Particularly, the present teaching is directed to methods, systems, and programming for estimating interests of a plurality of users with respect to a new piece of information.

BACKGROUND

Recommendation techniques are increasingly being used to provide relevant and enjoyable information to users based on users' feedback and stated preferences. One of the most common and effective recommendation techniques is Collaborative Filtering (CF), which relies only on past user behavior (e.g., previous transactions or feedback), and does not require creations of explicit profiles.

FIG. 1A, FIG. 1B and FIG. 1C (Prior Art) illustrate a user rating prediction process based on CF, according to a prior art system. As shown in FIG. 1A, users 101-105 provides rating regarding different items (like images 111, books 112, videos 113, games 114). After that, the system is making predictions about user 105's rating for the item 113, which the user 105 has not rated yet. The prediction can be made based on existing ratings of other users, who have similar ratings with the user 105. As shown in FIG. 1B, users 102 and 103 have similar ratings with the user 105 regarding other items. Therefore, user 105's rating for the item 113 is estimated based on users 102 and 103's ratings for the item 113. As shown in FIG. 1C, the system has made a prediction that the user 105 won't like the video 113, as users 102 and 103.

A problem arising when employing CF techniques is the cold-start problem, which is caused by the system's incapability of dealing with new items or new users due to the lack of relevant transaction history. To mitigate the item-cold problem of CF, existing techniques focus on utilizing external content on top of users' feedback. When a new item comes, the existing techniques leverage the new item's attributes and combine them with the CF model. Thus, existing works require the new item's content or context data that may not be available. In addition, traditional systems for estimating user interests with respect to a new item did not provide a way to effectively select a subset of users for obtaining interests with respect to the new item and estimate interests of all users based on the obtained interests.

Therefore, there is a need to provide a solution for estimating user interests with respect to a new item to avoid the above-mentioned drawbacks.

SUMMARY

The teachings disclosed herein relate to methods, systems and programming for estimating user interests. More particularly, the present teaching is directed to methods, systems, and programming for estimating interests of a plurality of users with respect to a new piece of information.

In one example, a method, implemented on a machine having at least one processor, storage, and a communication platform connected to a network for estimating interests of a plurality of users with respect to a new piece of information is disclosed. Historical interests of the plurality of users are obtained with respect to one or more existing pieces of information. One or more users are selected from the plurality of users. Historical interests of the one or more users can minimize an objective function over the plurality of users. Interests of the one or more users are obtained with respect to the new piece of information. Estimated interests of the plurality of users are generated with respect to the new piece of information based on the obtained interests of the one or more users.

In another example, a system, having at least one processor, storage, and a communication platform connected to a network for estimating interests of a plurality of users with respect to a new piece of information is disclosed. The system comprises a user interest retriever, a reviewer selection unit, a review receiver, and a user interest estimation unit. The user interest retriever is configured to obtain historical interests of the plurality of users with respect to one or more existing pieces of information. The reviewer selection unit is configured to select one or more users from the plurality of users. Historical interests of the one or more users can minimize an objective function over the plurality of users. The review receiver is configured to obtain interests of the one or more users with respect to the new piece of information. The user interest estimation unit is configured to generate estimated interests of the plurality of users with respect to the new piece of information based on the obtained interests of the one or more users.

Other concepts relate to software for estimating interests of a plurality of users. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine-readable tangible and non-transitory medium having information recorded thereon for estimating interests of a plurality of users with respect to a new piece of information is disclosed. The information, when read by the machine, causes the machine to perform the following. Historical interests of the plurality of users are obtained with respect to one or more existing pieces of information. One or more users are selected from the plurality of users. Historical interests of the one or more users can minimize an objective function over the plurality of users. Interests of the one or more users are obtained with respect to the new piece of information. Estimated interests of the plurality of users are generated with respect to the new piece of information based on the obtained interests of the one or more users.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
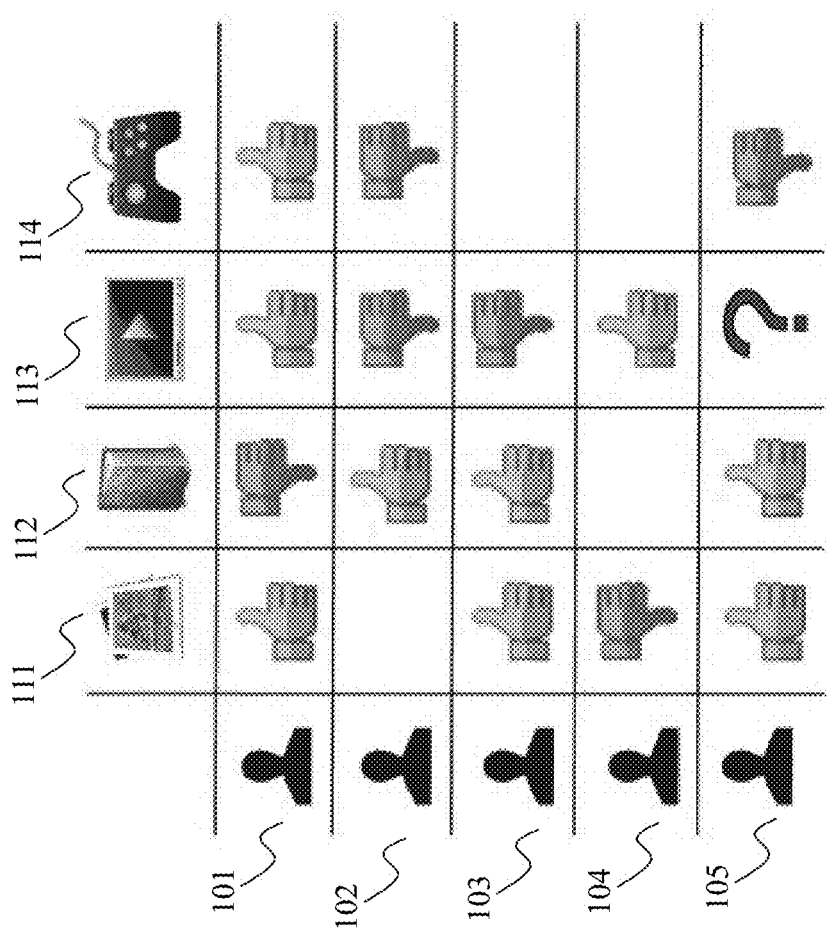
FIG. 1A, FIG. 1B and FIG. 1C (Prior Art) illustrate a user rating prediction process based on CF, according to a prior art system.
Figure 1B:
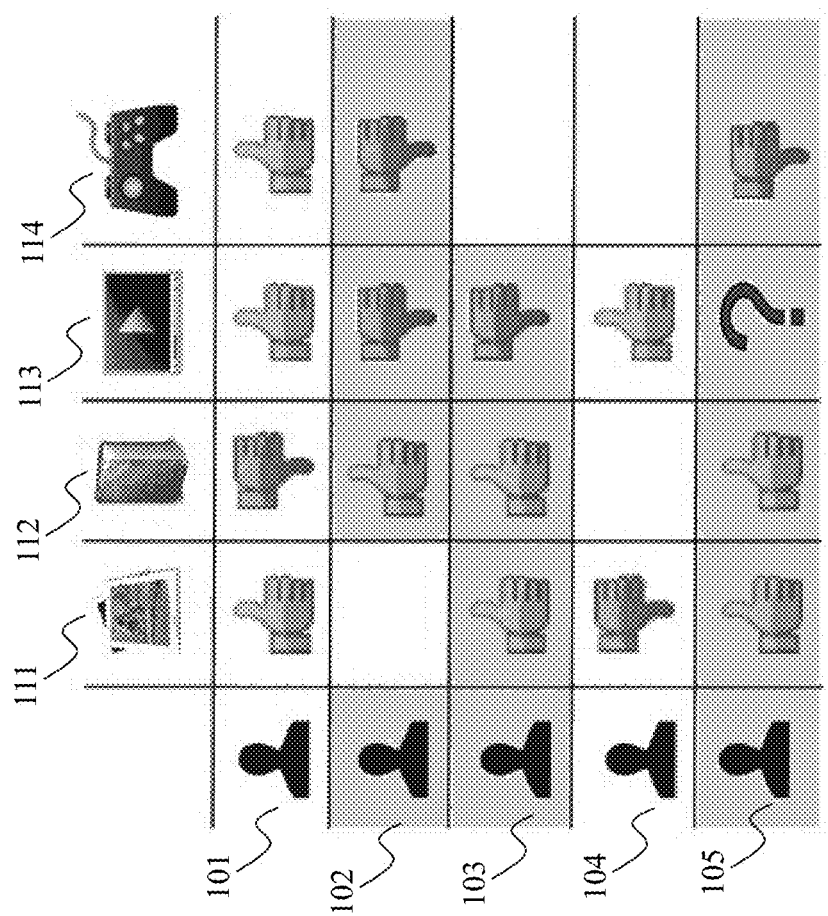
Figure 1C:
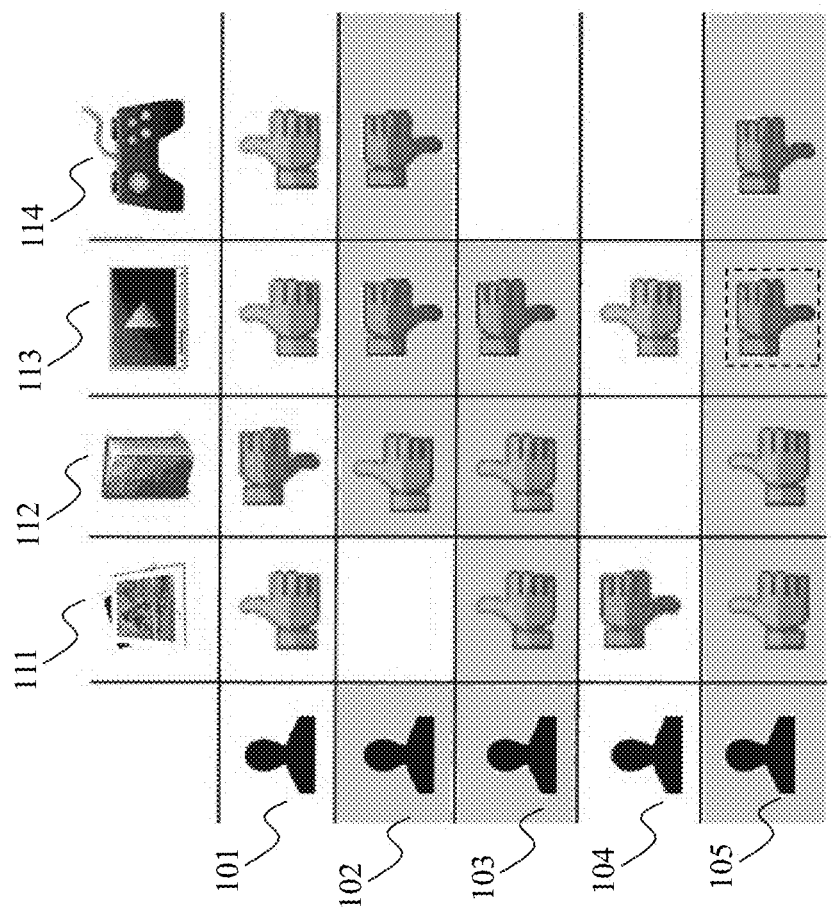

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure describes method, system, and programming aspects of effective user interest estimation with respect to a new item or new piece of information. A system, e.g. a recommender system, may estimate user interests based on CF to provide better modeling of users and items associated with considerable rating history. The lack of historical ratings regarding a new item results in the item cold-start problem.

According to various embodiments of the present teaching, an item cold-start problem is considered without assuming any availability of context or content-based information. For example, a publisher has a set of customers, and is aware of those customers' historical ratings of existing items (movies, books, etc.). The publisher is interested in evaluating a new item of which ratings are not available yet. The present teaching allows the publisher (maybe via a CF-based interest evaluation engine) to select a predetermined number (e.g. B) of reviewers from a pool of available reviewers, and obtain ratings of the new item from the B reviewers. Then, the publisher estimates how the customers (including the non-selected reviewers) will rate the new item.

In this example, we assume the publisher has no prior knowledge about the new item, e.g. no information regarding context or content of the new item is available, when selecting the reviewers. In addition, to mitigate the reviewing period, the B reviewers are selected at once, so that the publisher does not have the luxury to receive some ratings and then to adaptively select additional reviewers based on those ratings.

In accordance with various embodiments of the present teaching, the budget-constrained reviewer selection problem is formulated as an optimization problem, in which the objective function stands for the prediction error of the users' ratings. For example, the B reviewers are selected because historical interests of the B reviewers can minimize an expected mean square error (MSE) between estimated interests and real interests of all reviewers with respect to the new item. Two algorithms for efficiently selecting the B reviewers will be disclosed in detail in the present teaching. After selecting the B reviewers and obtaining interests or ratings of the new item from the B reviewers, the publisher in the present teaching may generate estimated interests of all users based on the obtained interests, e.g. according to a least squares model.

The methods described in the present teaching can also be applied to the user cold-start problem. In this case, the system may select the items and request the new user to rate the selected items. Then the system may estimate the new user's CF vector based on the new user's rating and the CF vectors of the selected items, in a way to minimize the new user's rating MSE over the other items.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 2A:
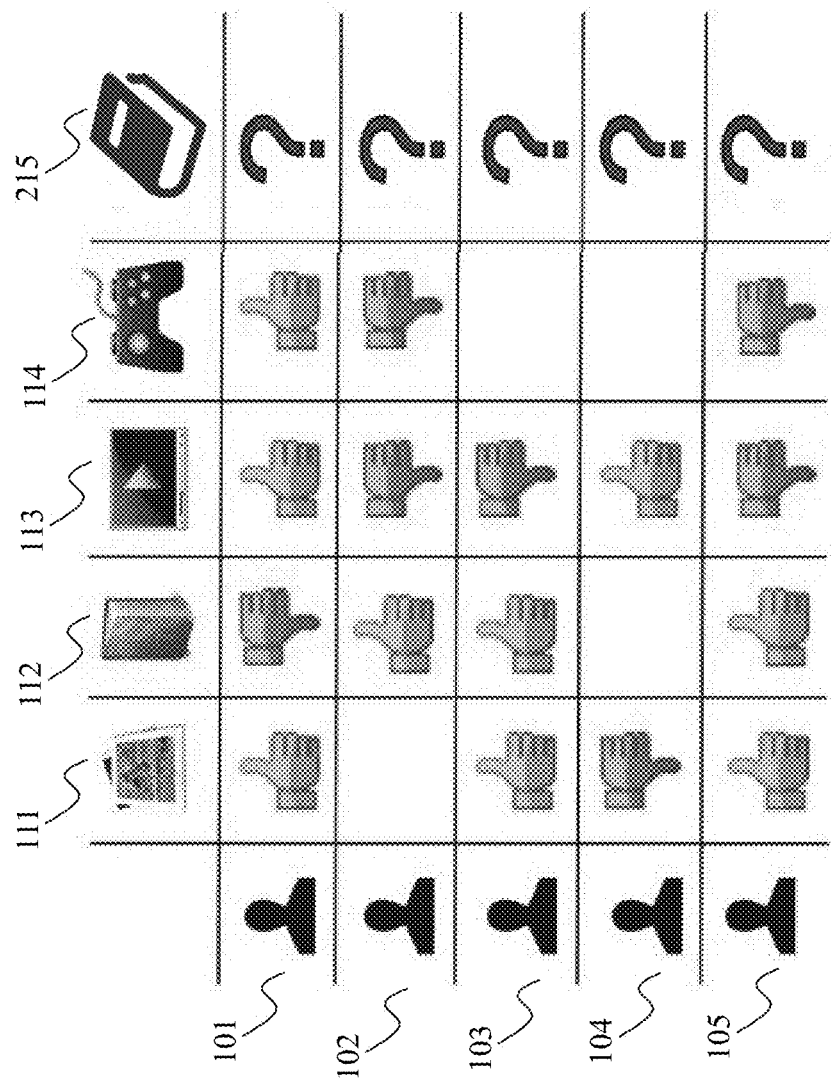
FIG. 2A, FIG. 2B and FIG. 2C illustrate a user rating prediction process based on CF, according to an embodiment of the present teaching.
Figure 2B:
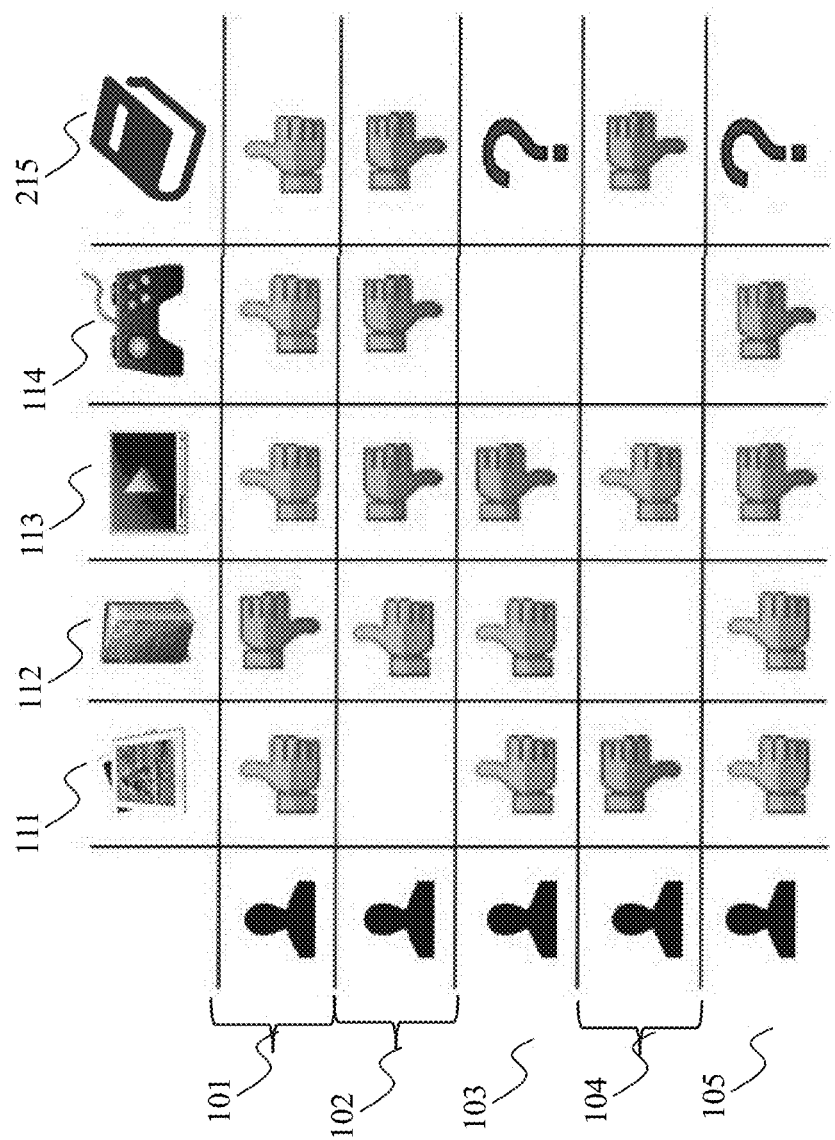
Figure 2C:
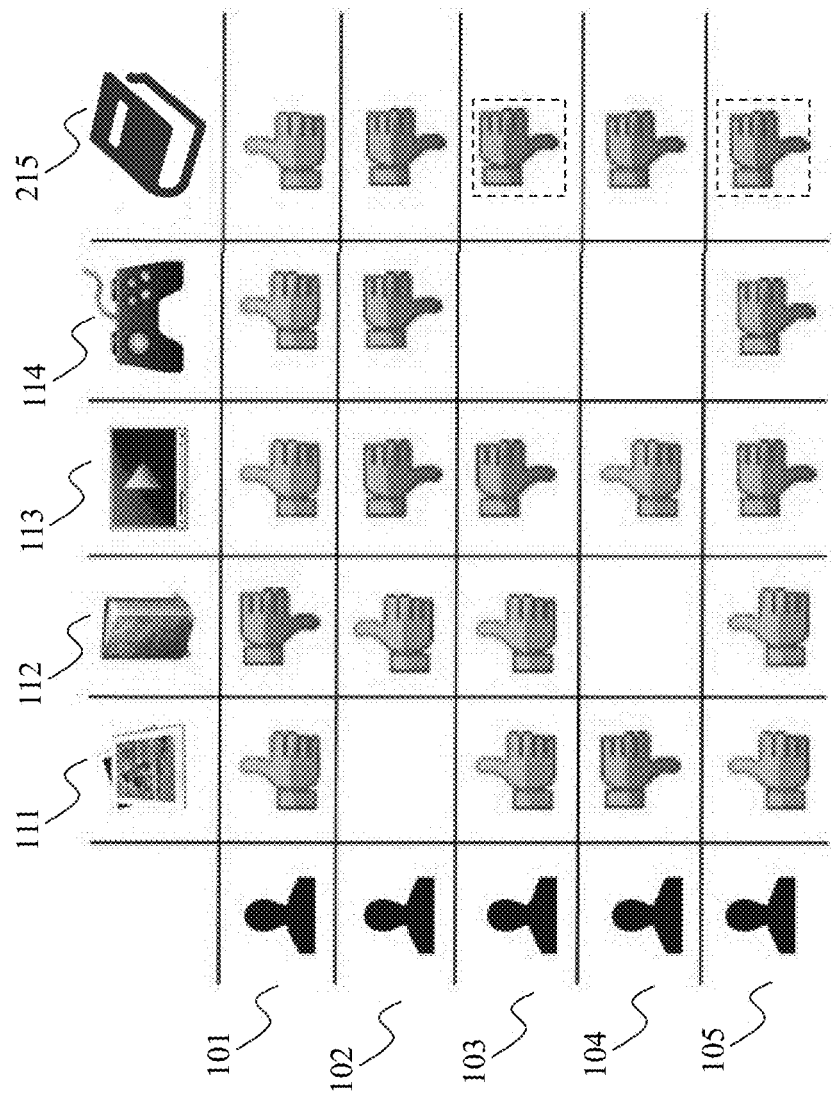

FIG. 2A, FIG. 2B and FIG. 2C illustrate a user rating prediction process based on CF, according to an embodiment of the present teaching. As shown in FIG. 2A, a new item, the book 215, is associated with the publisher without ratings from any users. The publisher in this example is interested in evaluating the new item by collecting ratings from three out of the five users and estimating ratings from the other two users based on the collected ratings. Different models can be used to select three users for rating. A common goal here is to select three users such that the other two users' ratings can be estimated as accurately as possible.

FIG. 2B shows one exemplary way to select the three users 101, 102, 104. One intuition behind this selection is that users 102, 103 and 105 have similar ratings regarding the existing items 111-114. Therefore, ratings from users 103 and 105 may be well predicted based on rating for user 102, with respect to the book 215. Since users 101 and 104 have different ratings regarding the existing items 111-114 from each other and from other users, their ratings regarding the book 215 may not be well predicted based on other users' ratings. Thus, it is better to collect their ratings directly than to estimate their ratings based on other ratings. As shown in FIG. 2C, in this example, the system has made a prediction that the users 103 and 105 won't like the book 215, as the user 102.

It can be understood by one skilled in the art that the above method for selecting users may be applied to any new piece of information including a new item, a new idea, a new thing, a new style, a new way, etc. In addition, interest of a user regarding a new piece of information may be represented in different ways, e.g. by a real number between 0 and 1, by an integer in a predetermined range (e.g. from 1 to 5), by a binary number that is either +1 or −1, or by symbols showing like or dislike as in FIGS. 2A-2C. In one embodiment, interest of a user may be obtained in an implicit way, for example, by detecting the user's behavior like clicking on a link, dwelling on a page, putting an item in a shopping cart, and recommending the item to others, etc. For example, interest of a user regarding an item may be represented by the user's dwell time over the item. Furthermore, the above method for selecting users may be formulated as an optimization problem to be described later in detail. It can also be understood that while the items in FIGS. 2A-2C belong to various groups, method and system disclosed in the present teaching also apply to items in a common group, e.g. movies, books, or games.

Figure 3:
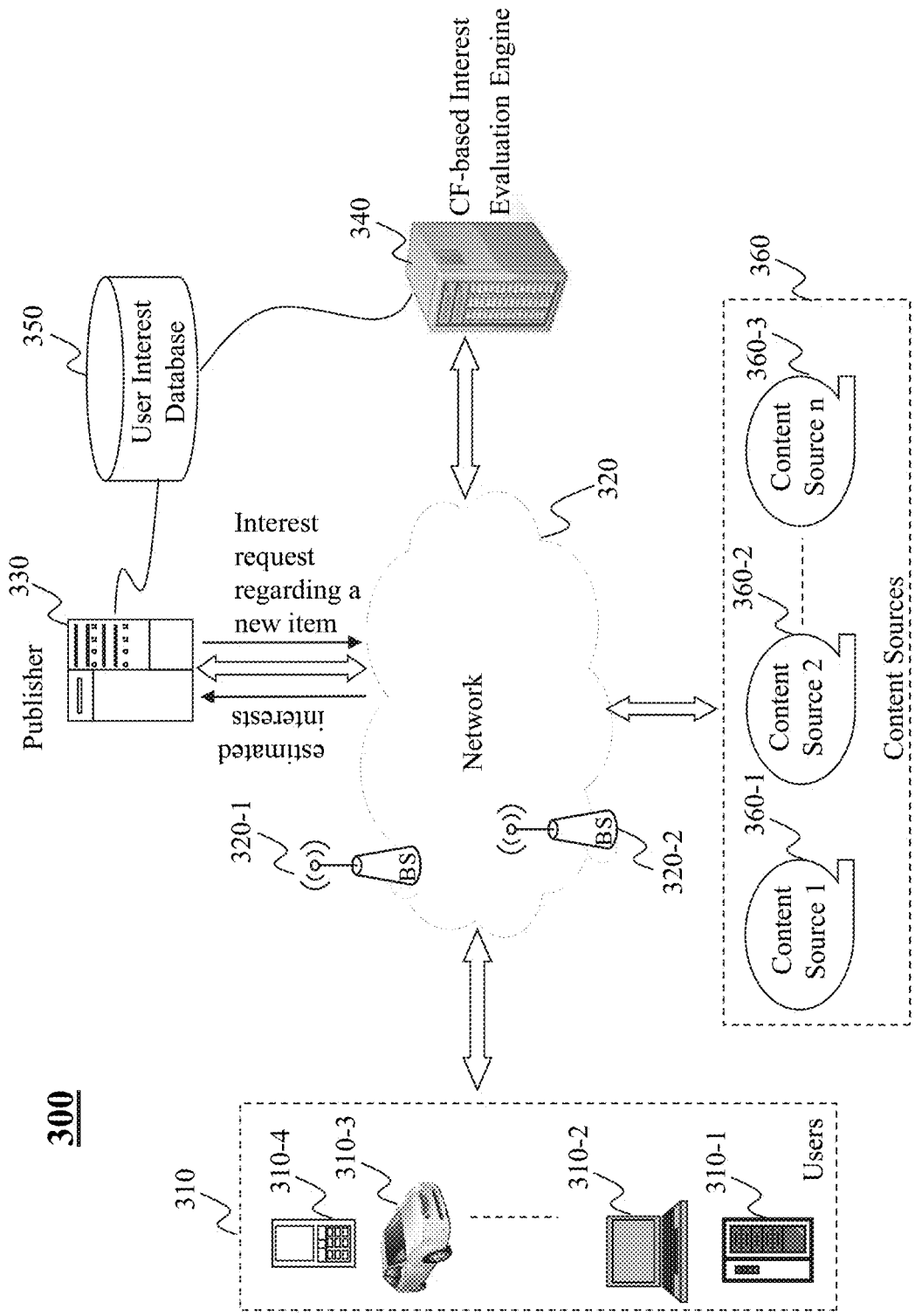
FIG. 3 is a high level depiction of an exemplary networked environment for CF-based user interest estimation, according to an embodiment of the present teaching.

FIG. 3 is a high level depiction of an exemplary networked environment 300 for CF-based user interest estimation, according to an embodiment of the present teaching. In FIG. 3, the exemplary networked environment 300 includes a publisher 330, a CF-based interest evaluation engine 340, a user interest database 350, one or more users 310, a network 320, and content sources 360. The network 320 may be a single network or a combination of different networks. For example, the network 320 may be a local area network (LAN), a wide area network (WAN), a public network, a private network, a proprietary network, a Public Telephone Switched Network (PSTN), the Internet, a wireless network, a virtual network, or any combination thereof. In an example of Internet advertising, the network 320 may be an online advertising network or ad network that is a company connecting advertisers to web sites that want to host advertisements. A key function of an ad network is aggregation of ad space supply from publishers and matching it with advertiser demand. The network 320 may also include various network access points, e.g., wired or wireless access points such as base stations or Internet exchange points 320-1 . . . 320-2, through which a data source may connect to the network 320 in order to transmit information via the network 320.

Users 310 may be of different types such as users connected to the network 320 via desktop computers 310-1, laptop computers 310-2, a built-in device in a motor vehicle 310-3, or a mobile device 310-4. A user 310-4 may receive a request for rating or proving a degree of interest regarding an item from the publisher 330 and/or to the CF-based interest evaluation engine 340 via the network 320. The user 310-4 may send information about the user's interest regarding the item to the publisher 330 and/or to the CF-based interest evaluation engine 340 via the network 320. The information may be sent either in an explicit way, e.g. giving a score representing a degree of interest regarding the item, or in an implicit way e.g. performing a behavior implying a degree of interest regarding the item.

The publisher 330 may provide different information and different items to the users 310 and collect interests of the users 310 regarding the information and items. In one example, the publisher 330 sends an interest request to the CF-based interest evaluation engine 340 via the network 320, and receives estimated interests of the users 310 with respect to some items.

The CF-based interest evaluation engine 340 can help the publisher 330 to collect the interests of the users 310, with respect to either an existing item or a new item. In this embodiment, the CF-based interest evaluation engine 340 directly connects to the network 320 and can communicate with the users 310 directly via the network 320.

The CF-based interest evaluation engine 340 can retrieve user interests from the user interest database 350. The user interest database 350 stores user interests, e.g. CF model vectors, for different users of the publisher 330. The stored user interests may include information related to different users' interests regarding different pieces of information, including but not limited to: the users' ratings, measurements e.g. click-through-rate (CTR) based on the users' historical behaviors, and the users' feedbacks in any form regarding a piece of information. The CF-based interest evaluation engine 340 can predict a user's interest based on the historical interests stored in the user interest database 350 and save the predicted or estimated interest into the user interest database 350.

The content sources 360 include multiple content sources 360-1, 360-2 . . . 360-3, such as vertical content sources. A content source 360 may correspond to a website hosted by an entity, whether an individual, a business, or an organization such as USPTO.gov, a content item provider such as cnn.com and Yahoo.com, a social network website such as Facebook.com, or a content feed source such as tweeter or blogs. The publisher 330 and the CF-based interest evaluation engine 340 may access information from any of the content sources 360-1, 360-2 . . . 360-3. For example, the publisher 330 may fetch content, e.g., a book, from a content source 360-1 to build a web page for publishing the book.

Figure 4:
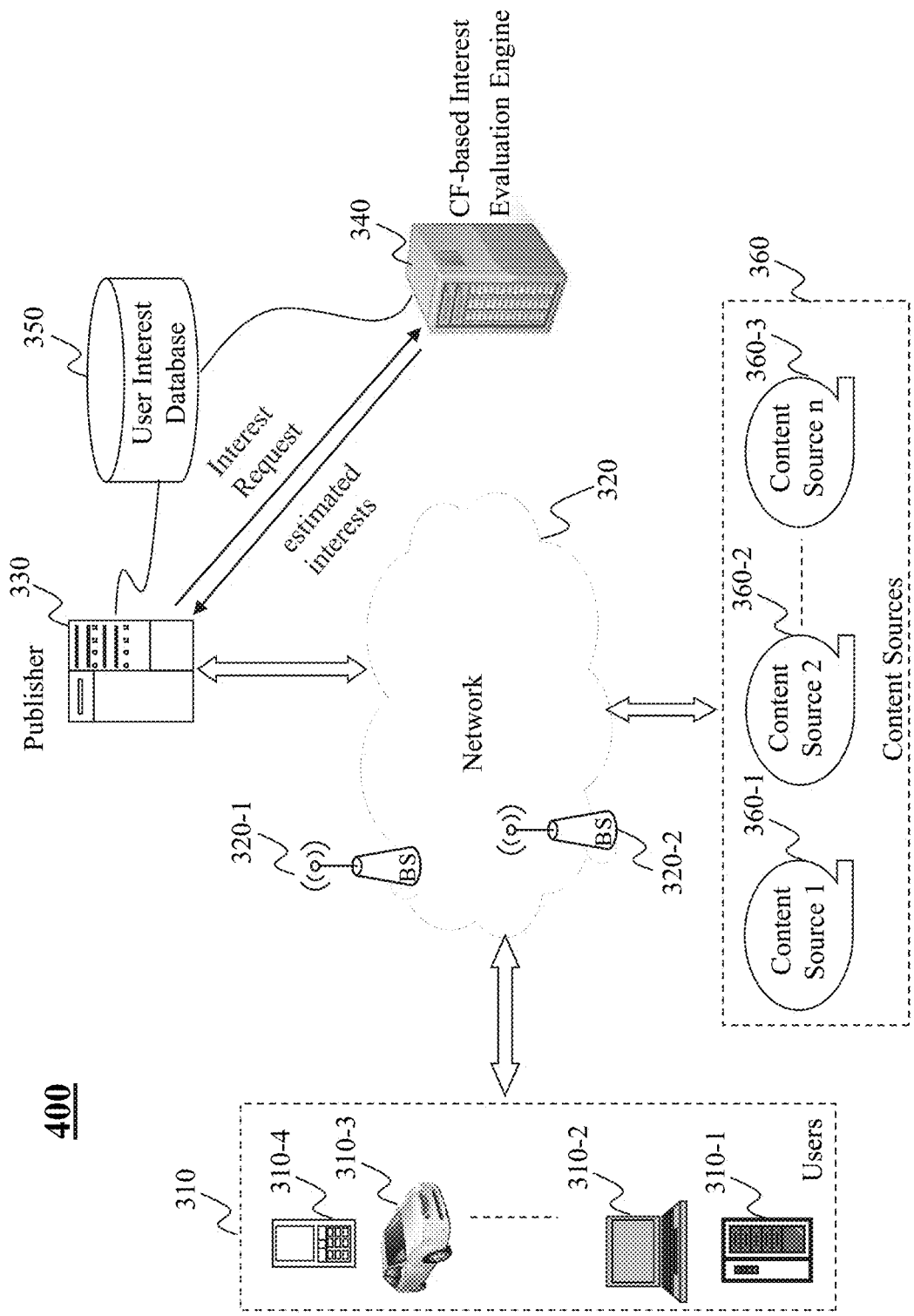
FIG. 4 is a high level depiction of another exemplary networked environment for CF-based user interest estimation, according to an embodiment of the present teaching.

FIG. 4 is a high level depiction of another exemplary networked environment 400 for CF-based user interest estimation, according to an embodiment of the present teaching. The exemplary networked environment 400 in this embodiment is similar to the exemplary networked environment 300 in FIG. 3, except that the CF-based interest evaluation engine 340 in this embodiment connects to the network 320 via the publisher 330. For example, the CF-based interest evaluation engine 340 may serve as a backend of the publisher 330 to estimate interests of the users 310 for the publisher 330.

Figure 5:
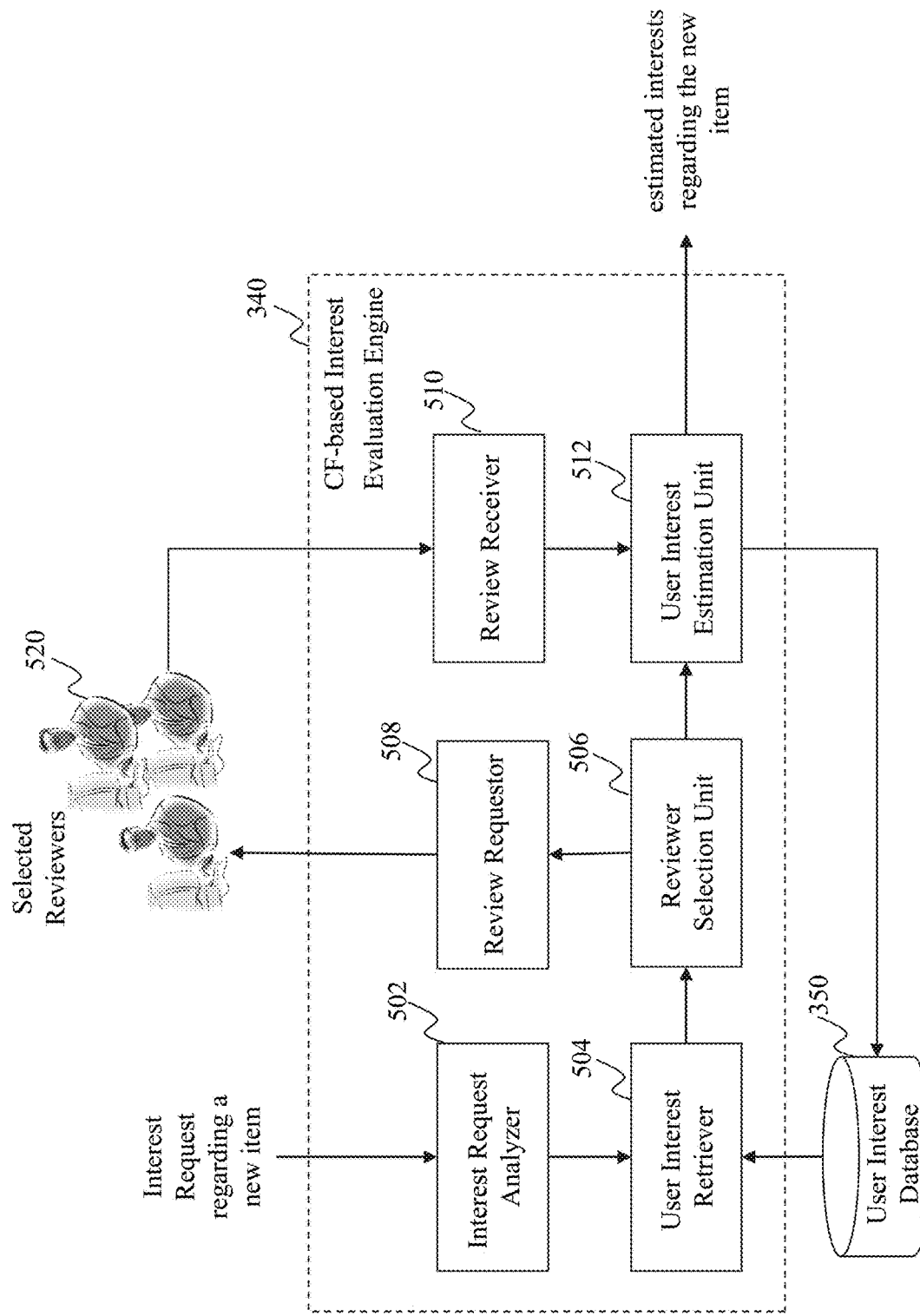
FIG. 5 illustrates an exemplary diagram of a CF-based interest evaluation engine for user interest estimation, according to an embodiment of the present teaching.

FIG. 5 illustrates an exemplary diagram of a CF-based interest evaluation engine 340 for user interest estimation, according to an embodiment of the present teaching. The CF-based interest evaluation engine 340 may be in an exemplary networked environment, e.g., the networked environment 300 in FIG. 3 or the networked environment 400 in FIG. 4. The CF-based interest evaluation engine 340 in this example includes an interest request analyzer 502, a user interest retriever 504, a reviewer selection unit 506, a review requestor 508, a review receiver 510, and a user interest estimation unit 512. The CF-based interest evaluation engine 340 in this example receives an interest request from a publisher, e.g. the publisher 330 and generates estimated interests of the users of the publisher. In some embodiments, the estimated interests may be transmitted to the publisher 330 and/or stored into the user interest database 350.

The interest request analyzer 502 in this example may receive an interest request from the publisher 330 and analyze the interest request to identify an item or a piece of information regarding which the interest is requested and/or to identify one or more users whose interests are requested. The analyzed information can be sent to the user interest retriever 504 by the interest request analyzer 502.

The user interest retriever 504 in this example receives the analyzed information from the interest request analyzer 502 and retrieves interests of users from the user interest database 350. The interests may include ratings and CF model parameters, e.g. latent factor vectors of users and items. The users available for rating or reviewing the requested item are called reviewers. In one embodiment, all users of the publisher 330 are reviewers. In another embodiment, reviewers are a subset of the users of the publisher 330, when e.g. the reviewers are online users among the users of the publisher 330. Then, the user interest retriever 504 may just retrieve interests of the available reviewers from the user interest database 350. After retrieving the interests, the user interest retriever 504 may send the retrieved interests to the reviewer selection unit 506.

In one situation, the interests are retrieved by the user interest retriever 504 based on the analyzed information. For example, when the interest request is for a given user's interest with respect to an existing item, this interest can be retrieved from the user interest database 350 if it is already available based on the historical data in the user interest database 350. If it is not available, the user interest retriever 504 may retrieve other users' interest with respect to the existing item, especially the users who had similar historical interests as the given user. In another situation, when the interest request is with respect to a new item regarding which no user interest has been stored in the user interest database 350, the user interest retriever 504 may retrieve historical interests of reviewers with respect to existing items from the user interest database 350.

The reviewer selection unit 506 in this example selects one or more reviewers from the available reviewers for collecting interests regarding the new item. In one embodiment, quantity of the selected one or more reviewers is a predetermined number. The selection is based on interests of the available reviewers regarding the existing items. In one example, a predetermined number of reviewers are selected so that historical interests of the selected reviewers minimize or maximize an objective function over the available reviewers. The objective function may include but not limited to an expected MSE between the estimated interests and real interests of the available reviewers with respect to the new item. Different objective functions can be applied to select the reviewers so that other reviewers' interests can be accurately estimated based on the interests of the selected reviewers. In one embodiment, the reviewer selection unit 506 selects the reviewers with knowledge of how to estimate other reviewers' interests based on the selected reviewers' interests. The reviewer selection unit 506 may send the information about the selected reviewers to the review requestor 508 and/or the user interest estimation unit 512.

The review requestor 508 in this example transmits a review request to each of the selected reviewers. For example, the review requestor 508 sends the selected reviewers a request for reviewing a new item, e.g. a new book. After checking the new book, each reviewer may provide a review regarding the new book in terms of: a rating, a comment, or a user activity. User activities may include either an action or inaction from a user or a reviewer. An action from a user may include pressing, swiping, clicking, rotating, zooming, scrolling, etc. An example of inaction from a user may be a dwell time within which the user does not provide any input. In one example, a review may also be provided by a user activity like clicking on a like or dislike icon with respect to the new book.

The review receiver 510 in this example receives review information from each of the selected reviewers, e.g. with respect to the new book. The review information represents interests of the selected reviewers with respect to the new book. The review receiver 510 may then send the received review information to the user interest estimation unit 512 for estimating interests of other reviewers and/or other users.

The user interest estimation unit 512 in this example receives information about the selected reviewers from the reviewer selection unit 506 and receives reviews of the selected reviewers from the review receiver 510. The user interest estimation unit 512 can estimate interests of all reviewers and/or all users with respect to the new item, based on the reviews from the selected reviewers. The user interest estimation unit 512 may analyze the reviews from the selected reviewers to determine interests, e.g. in terms of ratings, of the selected reviewers regarding the new item. The user interest estimation unit 512 may then predict or estimate all reviewers' interests regarding the new item.

In one example, the estimated interests for the selected reviewers are same as the obtained interests of the selected reviewers based on their reviews, so that the user interest estimation unit 512 just estimates interests of the remaining or non-selected reviewers. In another example, after generating estimated interests of the reviewers, the user interest estimation unit 512 may estimate interests of all users, including reviewers and non-reviewers (e.g. offline users), with respect to the new item based on the estimated interests of the reviewers.

According to various embodiments, the user interest estimation unit 512 may predict the interests of the non-selected reviewers based on an interest prediction model. For example, the interest prediction model may be a least squares model. In one embodiment, the reviewer selection unit 506 has knowledge of the interest prediction model to be used by the user interest estimation unit 512, when selecting the reviewers.

After generating the estimated interests of the reviewers or the users, the user interest estimation unit 512 may send the estimated interests to the publisher 330 as a response to the interest request. In one embodiment, the user interest estimation unit 512 may also save the estimated interests into the user interest database 350 for future use.

Figure 6:
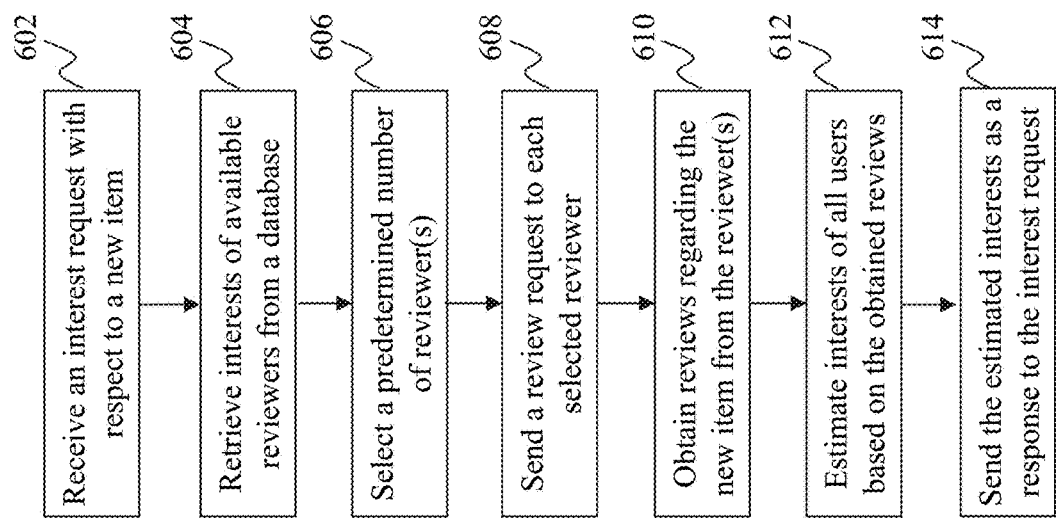
FIG. 6 is a flowchart of an exemplary process performed by a CF-based interest evaluation engine, according to an embodiment of the present teaching.

FIG. 6 is a flowchart of an exemplary process performed by a CF-based interest evaluation engine, according to an embodiment of the present teaching. In one example, the exemplary process in FIG. 6 may be performed by the CF-based interest evaluation engine 340 shown in FIG. 5. Starting at 602, an interest request with respect to a new item is received. At 604, interests of available reviewers regarding existing items are retrieved from a database, e.g. the user interest database 350. At 606, a predetermined number of reviewer(s) are selected from available reviewers, based on the retrieved interests. At 608, a review request is sent to each selected reviewer. At 610, reviews regarding the new item are obtained from the selected reviewer(s). At 612, interests of all reviewers or all users are estimated based on the obtained reviews. At 614, the estimated interests are sent as a response to the interest request. In one embodiment, the estimated interests are saved in the database.

Figure 7:
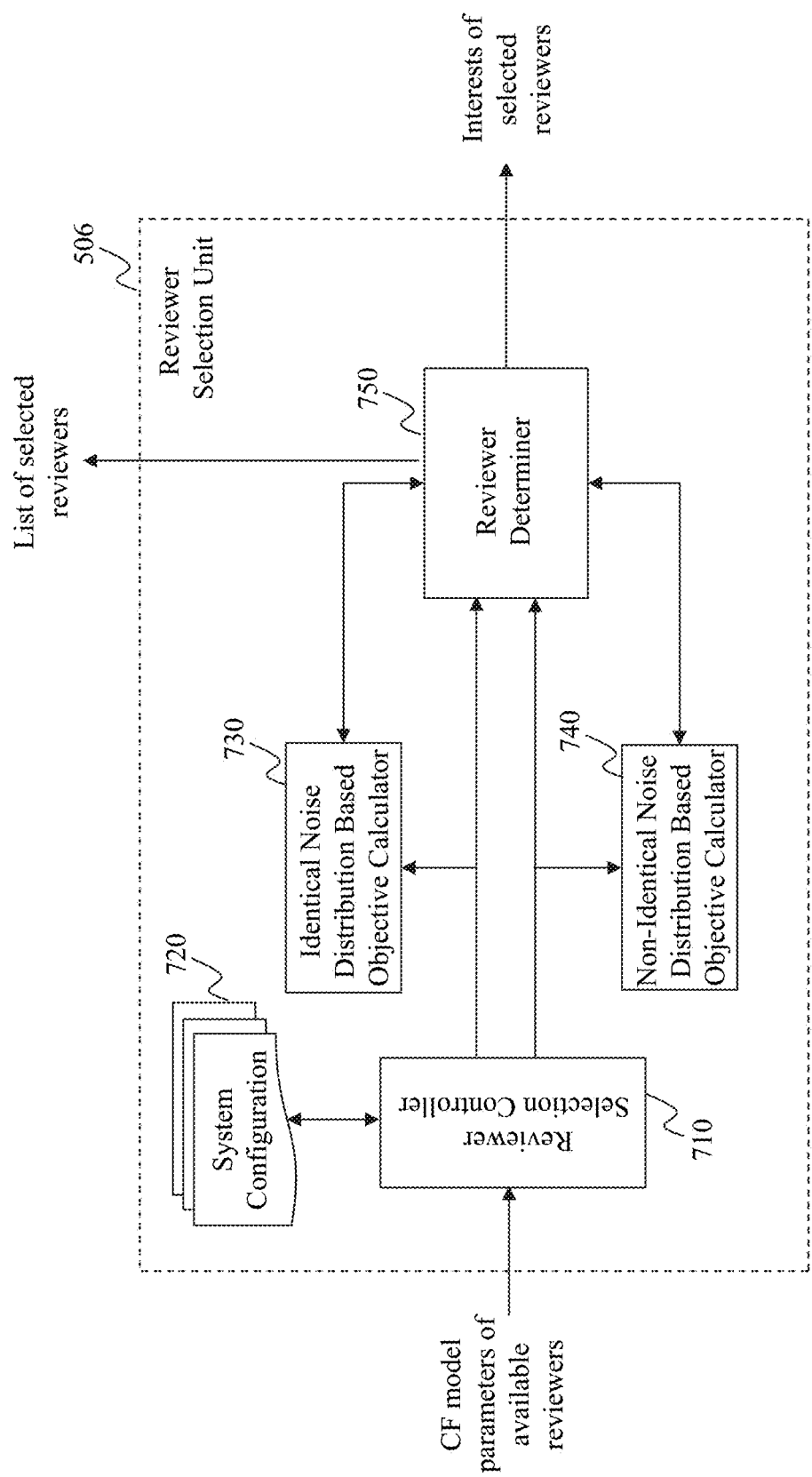
FIG. 7 illustrates an exemplary diagram of a reviewer selection unit in a CF-based interest evaluation engine, according to an embodiment of the present teaching.

FIG. 7 illustrates an exemplary diagram of a reviewer selection unit 506 in a CF-based interest evaluation engine, e.g. the CF-based interest evaluation engine 340 in FIG. 5, according to an embodiment of the present teaching. In this illustrated embodiment, one or more reviewers are selected from the available reviewers according to a system configuration, which indicates information about noise terms during calculation.

The reviewer selection unit 506 in this example includes a reviewer selection controller 710, system configuration 720, an identical noise distribution based objective calculator 730, a non-identical noise distribution based objective calculator 740, and a reviewer determiner 750. The reviewer selection controller 710 in this example receives interests of available reviewers from the user interest retriever 504. The interests in this example may include ratings and CF model parameters, e.g. latent factor vectors. A prediction model for a rating is derived as below for this example.

In this example, I denotes the set of all items; $\mathcal{V}$ denotes the set of all reviewers; $\mathcal{U}$ denotes the set of all users. The cardinality of these sets is denoted by $|I|=m$, and $|\mathcal{V}|+|\mathcal{U}|=n$. Accordingly, $\mathcal{R}$ denotes a rating matrix of size n*m, where each element in $\mathcal{R}$ is a rating. A rating $r_{ui}$ indicates the preference of item i by user u; and a rating $r_{vi}$ indicates the preference of item i by reviewer v, where high values mean stronger preference. While it is assumed here that $\mathcal{V}$ and $\mathcal{U}$ do not have an overlap, it can be understood that the same model can be applied when they have an overlap, or when $\mathcal{V}$ is a subset of $\mathcal{U}$. In one embodiment, the matrix $\mathcal{R}$ is sparse, when most users rate just a small subset of the items.

A Latent Factor Model (LFM) is used in this example to represent each rating $r_{ui}$ as the following:

$$r_{ui}=\mu+b_i+b_u+Q_i^T P_u+\epsilon_{ui}, \quad (1)$$

where $\mu\in\mathbb{R}$ the overall average rating in $\mathcal{R}$; $b_i\in\mathbb{R}$ and $Q_i\in\mathbb{R}^k$ are the bias and the latent factor vector of item i, respectively; $b_u\in\mathbb{R}$ and $P_u\in\mathbb{R}^k$ are the bias and the latent factor vector of user u, respectively; $\epsilon_{ui}$ is a zero-mean noise term; and k denotes dimension of the latent factor vector. Intuitively, the term $Q_i^T P_u$ captures the interaction between user u and item i, where high values imply stronger preference and vice versa. A rating $r_{vi}$ can be represented in a similar way by replacing u with v in the above equation (1).

A bias for a user may represent a user's personal (biased) habit about rating, e.g. always rating between 3 and 5 although the range of rating is 0-5. A bias for an item may represent users' bias to an item, e.g. a shirt of one football player is rated by fans of another football player. A latent factor vector described above includes k latent factors that are related to a user or an item. For example, although a user has always rated items between 3 and 5, a latent factor may indicate that the user can give a rating of 1 when a new item comes.

In one embodiment, the values of $\mu$, $b_u$, and $P_u$ are given by the prediction model (1), i.e. available by the retrieved historical interests from the user interest database 350, whereas $b_i$ and $Q_i$ are unknown since the new item i was not considered while training the model. Thus, following the model, a predicted or estimated rating $\tilde{r}_{ui}$ of the $r_{ui}$ regarding the new item i can be generated by estimating $b_i$ and $Q_i$. Based on the estimates $(\tilde{b}i, \tilde{Q}_i^T)$, an estimate $\tilde{r}_{ui}$ can be generated as the following:

$$\tilde{r}_{ui}=\mu+\tilde{b}_i+b_u+\tilde{Q}_i^T P_u. \quad (2)$$

An item cold-start problem can be formulated as below. Let i be a new item ($i\notin I$), and denote by $v^i \subset v$ the pool of available reviewers to rate the new item i. A budget constraint is denoted by B, where B is the number of reviewers to be selected to rate the item i, and use the notation $v_B$ for subsets of $v^i$, which are of size B. Given a budget constraint B, the item cold-start problem may be formulated to select B reviewers to rate item i in order to optimize an objective function. In this example, the reviewer selection unit 506 selects B reviewers to rate item i in order to minimize the expected MSE on the set of users $\mathcal{U}$. Mathematically, the reviewer selection unit 506 selects the B reviewers by solving the following optimization problem:

$$\min_{v_B^i \subset v^i} \left\{ \mathbb{E}\left[ \frac{1}{|\mathcal{U}|} \cdot \sum_{u \in \mathcal{U}} (\tilde{r}_{ui} - r_{ui})^2 \right] \right\} \quad (3)$$

where $\tilde{r}_{ui}$ depends on the set of selected B reviewers $v_B^i$ and their ratings of item i.

The reviewer selection unit 506 is configured to estimate the MSE over the users set for each selection of B reviewers, without exposing their actual ratings, and make the selection according to equation (3). A solution to the equation (3) is related to system configuration 720 stored in the reviewer selection unit 506. According to one exemplary system configuration, the noise terms $\{\epsilon_{ui}\}$ are assumed to be zero-mean, independent and identically distributed (i.i.d.); while according to another exemplary system configuration, the noise terms $\{\epsilon_{ui}\}$ are assumed to be zero-mean and independent (but not identically distributed).

After receiving the interests of the available reviewers, the reviewer selection controller 710 identifies the reviewer set $v^i$ and generates a latent factor vector $P_v$ for each reviewer. The reviewer selection controller 710 retrieves system configuration 720 to determine whether the noise terms are assumed to be identically distributed. If so, the reviewer selection controller 710 sends information about the reviewer set and the generated latent factor vectors to the identical noise distribution based objective calculator 730 and the reviewer determiner 750 for selecting the B reviewers. Otherwise, the reviewer selection controller 710 sends information about the reviewer set and the generated latent factor vectors to the non-identical noise distribution based objective calculator 740 and the reviewer determiner 750 for selecting the B reviewers. In one embodiment, the reviewer selection controller 710 also sends system configuration to the non-identical noise distribution based objective calculator 740 and the reviewer determiner 750 for selecting the B reviewers.

When the noise terms $\{\epsilon_{ui}\}$ are assumed to be i.i.d., the optimization problem considered in equation (3) can be reduced to the following simpler problem:

$$\min_{v_B^i \subset v^i} \left\{ \sigma^2 \cdot \text{Trace}\left((P_B P_B^T)^{-1}\right) + \sigma^2 \right\}, \quad (4)$$

where $P_B$ denotes a matrix whose columns correspond to the latent factor vectors $P_B$' for $v \in v_B^i$; $\mathbb{E}[\epsilon_{ui}]=0$; and $\mathbb{E}[\epsilon_{ui}^2]=\sigma^2$.

The identical noise distribution based objective calculator 730 and the reviewer determiner 750 cooperate to select B reviewers by solving an optimization problem, e.g. the one in equation (3) or the one in equation (4). As shown in the above equation (4), one method to select B reviewers is to minimize the term $\text{Trace}((P_B P_B^T)^{-1})$ which represents the error originating from a sub-optimal choice of the item's parameters, i.e., from the distance between $(b_i, Q_i^T)$ and $(\tilde{b}_i, \tilde{Q}_i^T)$. In accordance with one embodiment, the identical noise distribution based objective calculator 730 and the reviewer determiner 750 select the B reviewers according to the following method, where $v_B^{ALG} \backslash v_j$ denotes a subset of reviewer set $v_B^{ALG}$ when the reviewer $v_j$ is excluded; $P_{B \backslash v_j}$ denotes the matrix $P_B$ when the column that corresponds to the reviewer $v_j$ is removed.

---

Method 1: Greedy Selection 1

---

1: Input: reviewers set $V^i$, and corresponding matrix $^P V^i$ whose columns correspond to the latent factor vectors $P'_v$ for $v \in V^i$.
2: Output: reviewers subset $V_B^{ALG}$.
3: Initialize $P_B = P_v^i$ and $V_B^{ALG} = V^i$.
4: for j = 1 to $|V^i| - B$ do
5:      $v_j \leftarrow \arg\min_{v \in V_B^{ALG}} \{\text{Trace } ((P_{B \backslash v} P_{B \backslash v}^T)^{-1})\}$
6:      Update $P_B \leftarrow P_{B \backslash v_j}$.
7:      Update $V_B^{ALG} \leftarrow V_B^{ALG} \backslash v_j$.
8: end for

---

Figure 8A:
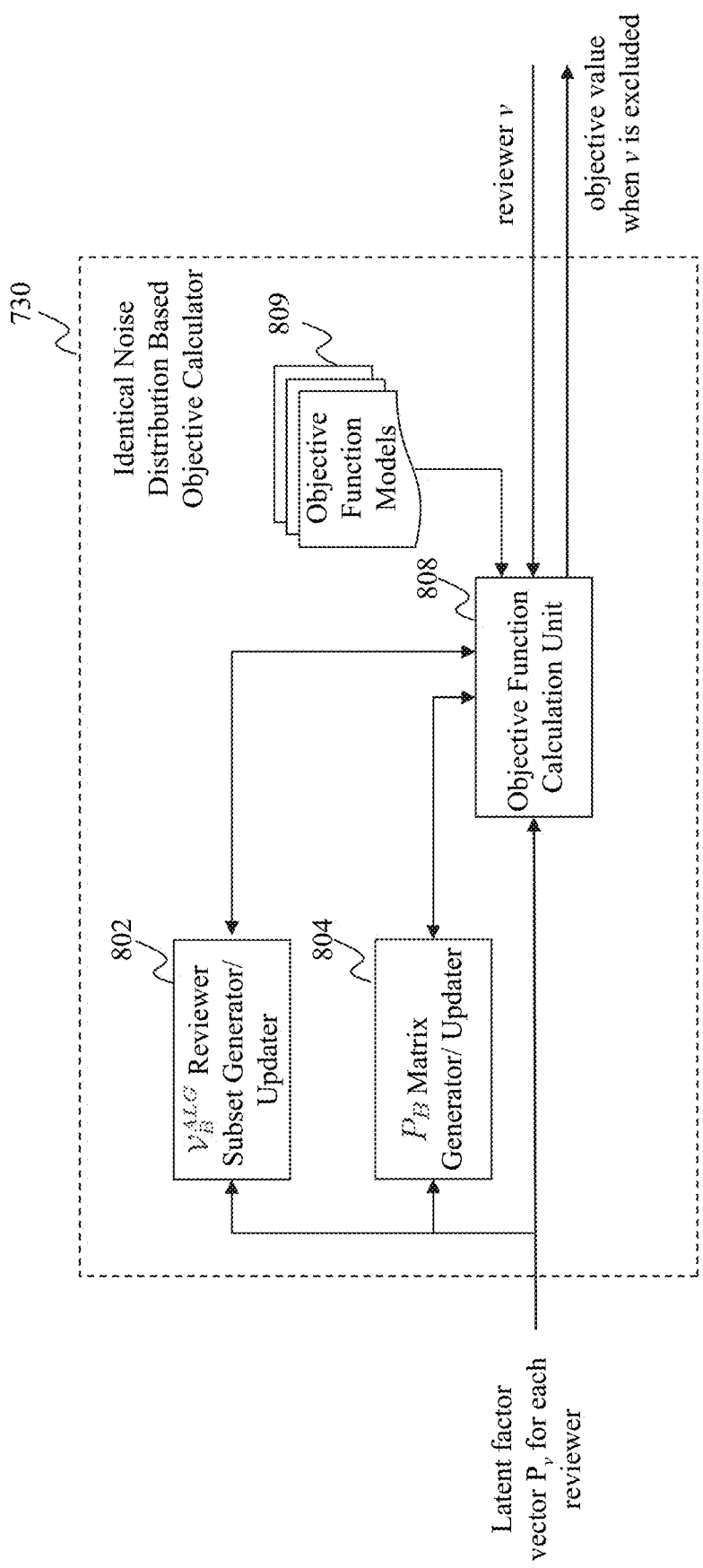
FIG. 8A illustrates an exemplary diagram of an identical noise distribution based objective calculator as in a reviewer selection unit, according to an embodiment of the present teaching.

This Method 1 may be realized by the identical noise distribution based objective calculator 730 and the reviewer determiner 750. FIG. 8A illustrates an exemplary diagram of an identical noise distribution based objective calculator 730 in a reviewer selection unit, e.g. the reviewer selection unit 506, according to an embodiment of the present teaching. In this illustrated embodiment, the identical noise distribution based objective calculator 730 includes a $v_B^{ALG}$ reviewer subset generator/updater 802, a $P_B$ matrix generator/updater 804, an objective function calculation unit 808, and objective function models 809.

The $v_B^{ALG}$ reviewer subset generator/updater 802 in this example generates $v_B^{ALG}$ with an initial value $v^i$ based on the identified reviewers at the reviewer selection controller 710, and updates $v_B^{ALG}$ by removing a reviewer v determined according to the Method 1. The $P_B$ matrix generator/updater 804 in this example generates the matrix $P_B$ based on latent factor vectors generated at the reviewer selection controller 710, and updates $P_B$ by removing one column corresponding to the reviewer v determined according to the Method 1.

The objective function calculation unit 808 in this example receives latent factor vectors $P_v$ from the reviewer selection controller 710, the updated $v_B^{ALG}$ from the $v_B^{ALG}$ reviewer subset generator/updater 802 and the updated $P_B$ from the $P_B$ matrix generator/updater 804. The objective function calculation unit 808 calculates an objective function according to an objective function model 809 by removing a reviewer v which is determined by the reviewer determiner 750. The reviewer determiner 750 may ask the objective function calculation unit 808 to try each reviewer in $v_B^{ALG}$ one by one in a predetermined order, based on known information of the reviewers or historical experience. The objective function model 809 may include but not limited to models according to equation (3), equation (4), and the equation described in line 5 of Method 1. After the objective function calculation unit 808 obtains each objective value by excluding each reviewer v, the objective function calculation unit 808 may send the objective values to the reviewer determiner 750. The reviewer determiner 750 may determine a reviewer $v_j$ with respect to which an optimal objective value can be achieved. For example, in Method 1, the reviewer $v_j$ should be selected to minimize the value $\text{Trace}((P_{B \backslash v_j} P_{B \backslash v_j}^T)^{-1})$. The objective function calculation unit 808 receives information about the selected reviewer $v_j$ from the reviewer determiner 750, sends the information to the $v_B^{ALG}$ reviewer subset generator/updater 802 for updating the $v_B^{ALG}$ and sends the information to the $P_B$ matrix generator/updater 804 for updating the $P_B$. This happens iteratively as described in the Method 1 until the number of reviewers in the $v_B^{ALG}$ is reduced to the budget B, which can be controlled by the objective function calculation unit 808 or by the reviewer determiner 750. After the B reviewers are selected, the objective function calculation unit 808 sends the updated $v_B^{ALG}$ and the updated $P_B$ to the reviewer determiner 750. The reviewer determiner 750 then obtains a list of selected reviewers from the updated $v_B^{ALG}$ and sends it to the review requestor 508 for requesting reviews or ratings. The reviewer determiner 750 may also obtain interests or ratings of the selected reviewers from the updated $P_B$ and sends them to the user interest estimation unit 512 for estimating interests of other reviewers or users.

In another embodiment, the objective function calculation unit 808 sends the objective value corresponding to a reviewer v to the reviewer determiner 750 immediately after obtaining the objective value. The reviewer determiner 750 always keeps the optimal (minimal in terms of Method 1) value corresponding to reviewer $v_j$ among the received objective values. If a new objective value corresponding to reviewer v is smaller than the current optimal value at the reviewer determiner 750, the reviewer determiner 750 will update the optimal value with the received objective value, and update the reviewer $v_j$ with the reviewer v.

Figure 9A:
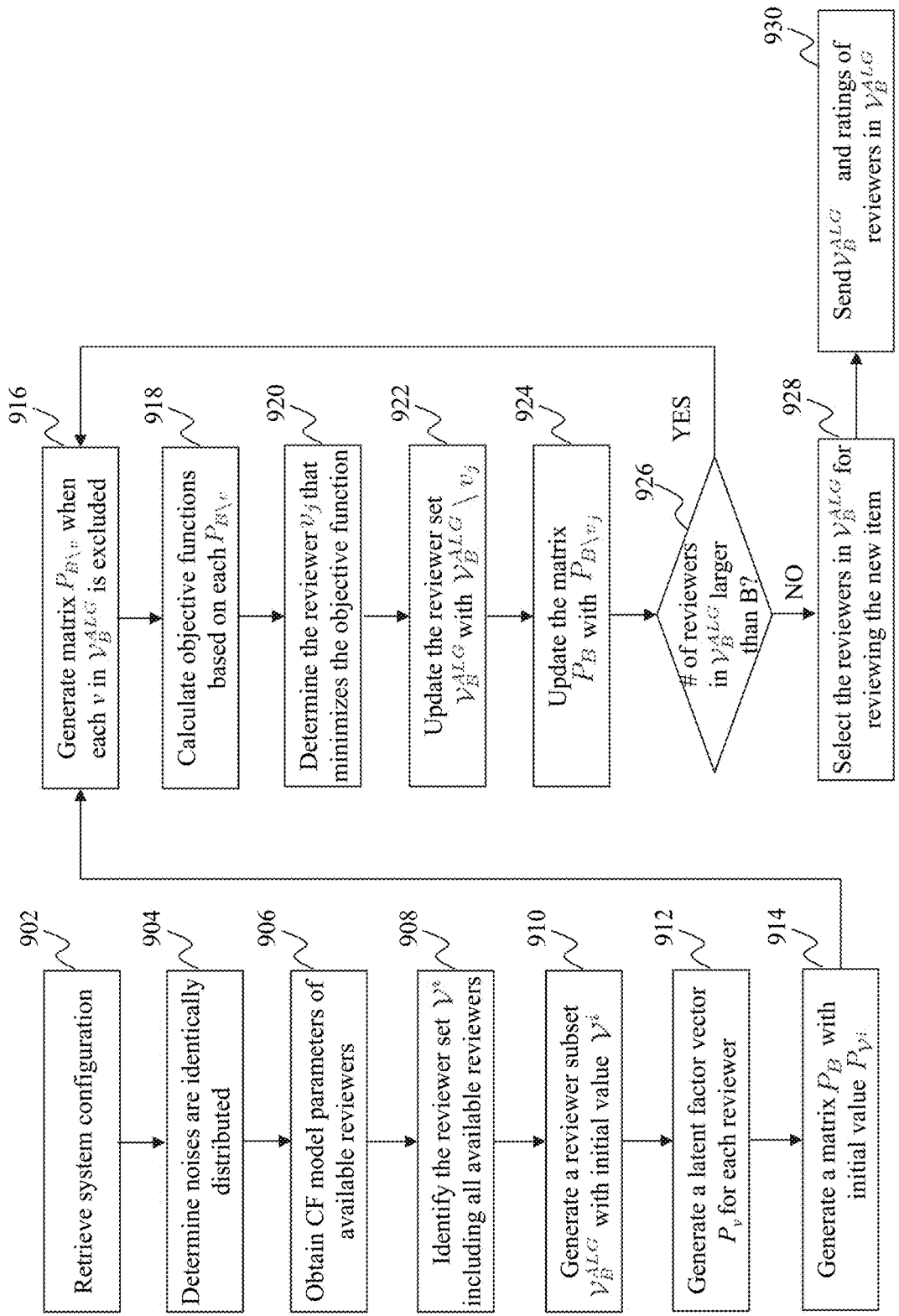
FIG. 9A is a flowchart of an exemplary process performed by a reviewer selection unit, according to an embodiment of the present teaching.

FIG. 9A is a flowchart of an exemplary process performed by a reviewer selection unit, e.g. the reviewer selection unit 506 in FIG. 7, according to an embodiment of the present teaching. In this illustrated embodiment, the noise terms are assumed to be i.i.d. according to system configuration.

At 902, system configuration is retrieved. At 904, noises are determined to be identically distributed. At 906, user interests of available reviewers are obtained, e.g. in terms of ratings. At 908, the reviewer set $v^i$ including all available reviewers is identified. At 910, a reviewer subset $v_B^{ALG}$ is generated and initially set up with $v^i$. At 912, a latent factor vector $P_v$ is generated for each reviewer v. At 914, a matrix $P_B$ is generated with initial value $P_{v^i}$, based on the latent factor vectors.

At 916, a matrix $P_{B \backslash v}$ is generated for each reviewer v by excluding the column corresponding to v from the matrix $P_B$. At 918, an objective function value is calculated based on each matrix $P_{B \backslash v}$. At 920, the reviewer $v_j$ is determined to minimize the objective function. At 922, the reviewer set $v_B^{ALG}$ is updated with $v_B^{ALG} \backslash v_j$ by removing the reviewer $v_j$ from $v_B^{ALG}$. At 924, the matrix $P_B$ is updated with $P_{B \backslash v_j}$, by removing the column corresponding to the reviewer $v_j$ from $P_B$.

At 926, it is checked whether the number of reviewers in $v_B^{ALG}$ is larger than the budget B. If so, the process goes back to 916 to determine another reviewer for removing from $v_B^{ALG}$. Otherwise, the process goes to 928, where the reviewers in $v_B^{ALG}$ are selected for reviewing the new item i. At 930, the list of reviewers in $v_B^{ALG}$ and their interests or ratings are sent for collecting reviews and estimating interests.

It can be understood that the order of steps in FIG. 9A is for illustration purpose only. Other orders may apply in accordance with other embodiments. For example, the process at 906 may be performed before 902 and 904.

Back to FIG. 7, when the noise terms $\{\epsilon_{ui}\}$ are assumed to be non-identically distributed, the optimization problem considered in equation (3) can be reduced to the following simpler problem:

$$\min_{v_B^i \subset v^i} \left\{ \text{Trace}((P_B C_B^{-2} P_B^T)^{-1}) + \frac{1}{|\mathcal{U}|} \sum_{u \in \mathcal{U}} \sigma_u^2 \right\}, \quad (5)$$

where $P_B$ denotes a matrix whose columns correspond to the latent factor vectors $P_v'$ for $v \in v_B^i$; $C_B$ denotes the square root of the covariance matrix that corresponds to $\epsilon_{ui}$ for $v \in v_B^i$; $\mathbb{E}[\epsilon_{ui}]=0$; and $\mathbb{E}[\epsilon_{ui}^2]=\sigma_u^2$.

The non-identical noise distribution based objective calculator 740 and the reviewer determiner 750 cooperate to select B reviewers by solving an optimization problem, e.g. the one in equation (3) or the one in equation (5). As shown in the above equation (5), one method to select B reviewers is to minimize the term $\text{Trace}((P_B C_B^{-2} P_B^T)^{-1})$ which represents the error originating from a sub-optimal choice of the item's parameters, i.e., from the distance between $(b_i, Q_i^T)$ and $(\hat{b}_i, \hat{Q}_i^T)$ when the noise terms are not identically distributed. In accordance with one embodiment, the non-identical noise distribution based objective calculator 740 and the reviewer determiner 750 select the B reviewers according to the following method, where $C_{v^i}$ refers to the square root of the covariance matrix of all reviewers; $v_B^{ALG} \backslash v_j$ denotes a subset of reviewer set $v_B^{ALG}$ when the reviewer $v_j$ is excluded; $P_{B \backslash v_j}$ denotes the matrix $P_B$ when the column that corresponds to the reviewer $v_j$ is removed; $C_{B \backslash v_j}$ denotes the square root of the covariance matrix that corresponds to $\epsilon_{ui}$ when the reviewer $v_j$ is excluded from $v_B^{ALG}$.

---

Method 2: Greedy Selection 2

1: Input: reviewers set $V^i$, and corresponding matrix $^P V^i$ whose columns correspond to the latent factor vectors $P'_v$ for $v \in V^i$.
2: Output: reviewers subset $v_B^{ALG}$.
3: Initialize $P_B = P_v^i$, $C_B = C_v^i$, and $V_B^{ALG} = V^i$.
4: for j = 1 to $|V^i|$ − B do
5: $\quad v_j \leftarrow \arg\min_{v \in V_B^{ALG}} \{\text{Trace}((P_{B \backslash v} C_{B \backslash v}^{-2} P_{B \backslash v}^T)^{-1})\}$
6: $\quad$ Update $P_B \leftarrow P_{B \backslash v_j}$ and $C_B \leftarrow C_{B \backslash v_j}$.
7: $\quad$ Update $V_B^{ALG} \leftarrow V_B^{ALG} \backslash v_j$.
8: end for

---

Figure 8B:
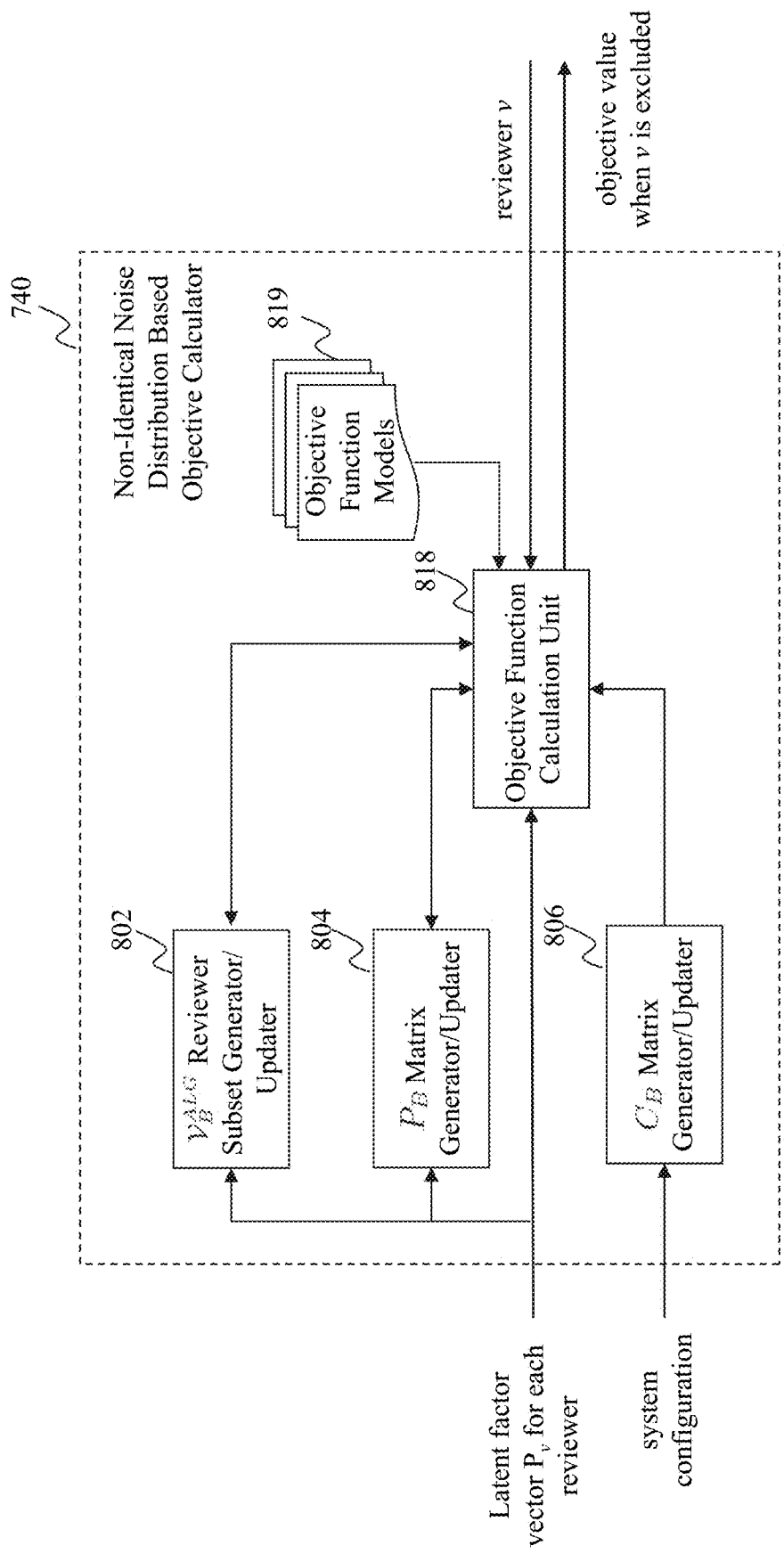
FIG. 8B illustrates an exemplary diagram of a non-identical noise distribution based objective calculator as in a reviewer selection unit, according to an embodiment of the present teaching.

This Method 2 may be realized by the non-identical noise distribution based objective calculator 740 and the reviewer determiner 750. FIG. 8B illustrates an exemplary diagram of a non-identical noise distribution based objective calculator 740 in a reviewer selection unit, e.g. the reviewer selection unit 506, according to an embodiment of the present teaching. In this illustrated embodiment, the non-identical noise distribution based objective calculator 740 includes the $v_B^{ALG}$ reviewer subset generator/updater 802, the $P_B$ matrix generator/updater 804, a $C_B$ matrix generator/updater 806; an objective function calculation unit 818, and objective function models 819.

The $v_B^{ALG}$ reviewer subset generator/updater 802 in this example generates $v_B^{ALG}$ with an initial value $v^i$ based on the identified reviewers at the reviewer selection controller 710, and updates $v_B^{ALG}$ by removing a reviewer v determined according to the Method 2. The $P_B$ matrix generator/updater 804 in this example generates the matrix $P_B$ based on latent factor vectors generated at the reviewer selection controller 710, and updates $P_B$ by removing one column corresponding to the reviewer v determined according to the Method 2. The $C_B$ matrix generator/updater 806 in this example generates the matrix $C_B$ based on system configuration about the noise terms $\epsilon_{ui}$ for $v \in v_B^i$, and updates $C_B$ with $C_{B \backslash v_j}$ according to the Method 2.

The 818 in this example receives latent factor vectors $P_v$ from the reviewer selection controller 710, the updated $v_B^{ALG}$ from the $v_B^{ALG}$ reviewer subset generator/updater 802, the updated $P_B$ from the $P_B$ matrix generator/updater 804, and the updated $C_B$ from the $C_B$ matrix generator/updater 806. The 818 calculates an objective function according to an objective function model 819 by removing a reviewer v which is determined by the reviewer determiner 750. The reviewer determiner 750 may ask the 818 to try each reviewer in $v_B^{ALG}$ one by one in a predetermined order, based on known information of the reviewers or historical experience. The objective function model 819 may include but not limited to models according to equation (3), equation (5), and the equation described in line 5 of Method 2. After the 818 obtains each objective value by excluding each reviewer v, the 818 may send the objective values to the reviewer determiner 750. The reviewer determiner 750 may determine a reviewer $v_j$ with respect to which an optimal objective value can be achieved. For example, in Method 2, the reviewer $v_j$ should be selected to minimize the value $\text{Trace}((P_{B \backslash v} C_{B \backslash v}^{-2} P_{B \backslash v}^T)^{-1})$. The 818 receives information about the selected reviewer $v_j$ from the reviewer determiner 750, sends the information to the $v_B^{ALG}$ reviewer subset generator/updater 802 for updating the $v_B^{ALG}$, sends the information to the $P_B$ matrix generator/updater 804 for updating the $P_B$, and sends the information to the $C_B$ matrix generator/updater 806 for updating the $C_B$. This happens iteratively as described in the Method 2 until the number of reviewers in the $v_B^{ALG}$ is reduced to the budget B, which can be controlled by the 818 or by the reviewer determiner 750. After the B reviewers are selected, the 818 sends the updated $v_B^{ALG}$ and the updated $P_B$ to the reviewer determiner 750. The reviewer determiner 750 then obtains a list of selected reviewers from the updated $v_B^{ALG}$ and sends it to the review requestor 508 for requesting reviews or ratings. The reviewer determiner 750 may also obtain interests or ratings of the selected reviewers from the updated $P_B$ and sends them to the user interest estimation unit 512 for estimating interests of other reviewers or users. In this example, the reviewer determiner 750 may also send the user interest estimation unit 512 information about system configuration including $C_B$.

In another embodiment, the 818 sends the objective value corresponding to a reviewer v to the reviewer determiner 750 immediately after obtaining the objective value. The reviewer determiner 750 always keeps the optimal (minimal in terms of Method 2) value corresponding to reviewer $v_j$ among the received objective values. If a new objective value corresponding to reviewer v is smaller than the current optimal value at the reviewer determiner 750, the reviewer determiner 750 will update the optimal value with the received objective value, and update the reviewer $v_j$ with the reviewer v.

Figure 9B:
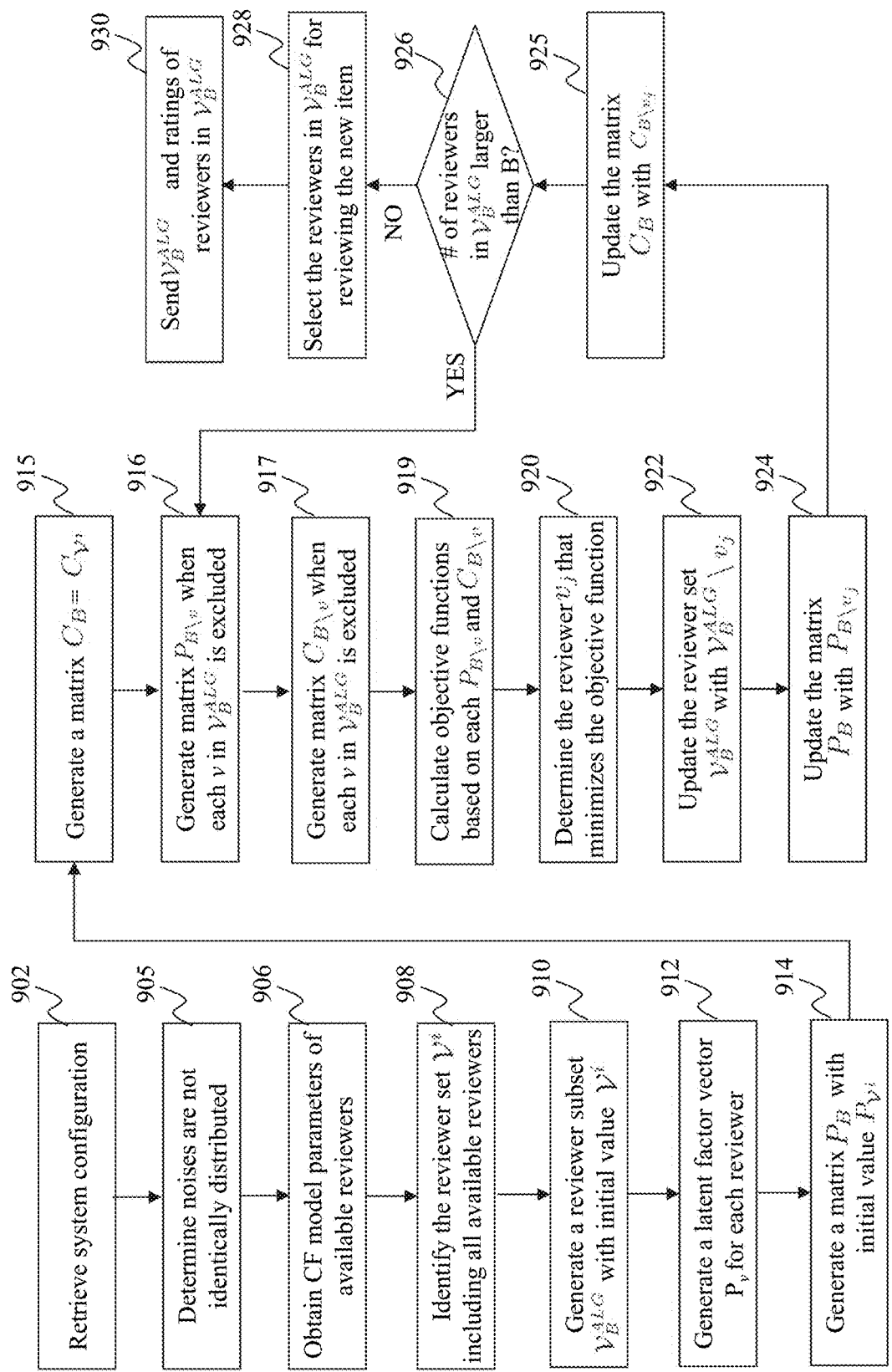
FIG. 9B is a flowchart of another exemplary process performed by a reviewer selection unit, according to an embodiment of the present teaching.

FIG. 9B is a flowchart of an exemplary process performed by a reviewer selection unit, e.g. the reviewer selection unit 506 in FIG. 7, according to an embodiment of the present teaching. In this illustrated embodiment, the noise terms are assumed to be independent but non-identically distributed according to system configuration.

At 902, system configuration is retrieved. At 905, noises are determined to be not identically distributed. At 906, user interests of available reviewers are obtained, e.g. in terms of ratings. At 908, the reviewer set $v^i$ including all available reviewers is identified. At 910, a reviewer subset $v_B^{ALG}$ is generated and initially set up with $v^i$. At 912, a latent factor vector $P_v$ is generated for each reviewer v. At 914, a matrix $P_B$ is generated with initial value $P_{v^i}$, based on the latent factor vectors. At 915, a matrix $C_B$ is generated with initial value $C_{v^i}$, based on configuration about the noise terms.

At 916, a matrix $P_{B\setminus v}$ is generated for each reviewer v by excluding the column corresponding to v from the matrix $P_B$. At 917, a matrix $C_{B\setminus v}$ is generated for each reviewer v by excluding v from $v_B^{ALG}$. At 919, an objective function value is calculated based on each matrix $P_{B\setminus v}$ and matrix $C_{B\setminus v}$. At 920, the reviewer $v_j$ is determined to minimize the objective function. At 922, the reviewer set $v_B^{ALG}$ is updated with $v_B^{ALG}\setminus v_j$ by removing the reviewer $v_j$ from $v_B^{ALG}$. At 924, the matrix $P_B$ is updated with $P_{B\setminus v_j}$, by removing the column corresponding to the reviewer $v_j$ from $P_B$. At 925, the matrix $C_B$ is updated with $C_{B\setminus v_j}$, by removing elements corresponding to the reviewer $v_j$ from $C_B$.

At 926, it is checked whether the number of reviewers in $v_B^{ALG}$ is larger than the budget B. If so, the process goes back to 916 to determine another reviewer for removing from $v_B^{ALG}$. Otherwise, the process goes to 928, where the reviewers in $v_B^{ALG}$ are selected for reviewing the new item i. At 930, the list of reviewers in $v_B^{ALG}$ and their interests or ratings are sent for collecting reviews and estimating interests.

It can be understood that the order of steps in FIG. 9B is for illustration purpose only. Other orders may apply in accordance with other embodiments. For example, the process at 906 may be performed before 902 and 905.

It can also be understood that methods other than Greedy Selection 1 and Greedy Selection 2 can be used for selecting the B reviewers. For example, the B reviewers can be selected randomly from the pool of available reviewers according to a random selection method. In another example, the B reviewers can be selected based on number or frequency of ratings provided by each reviewer, according to a frequent rating method. In another example, the B reviewers can be selected based on variance or diversity of ratings provided by each reviewer, according to an edgy rating method. In another example, the B reviewers can be selected by inviting all reviewers to review the new item and consider chronologically the first B reviewers who returned their ratings, according to an early birds rating method. In yet another example, the B reviewers can be selected by splitting all reviewers into multiple clusters and select reviewers from each cluster, according to a clustering method.

Figure 10:
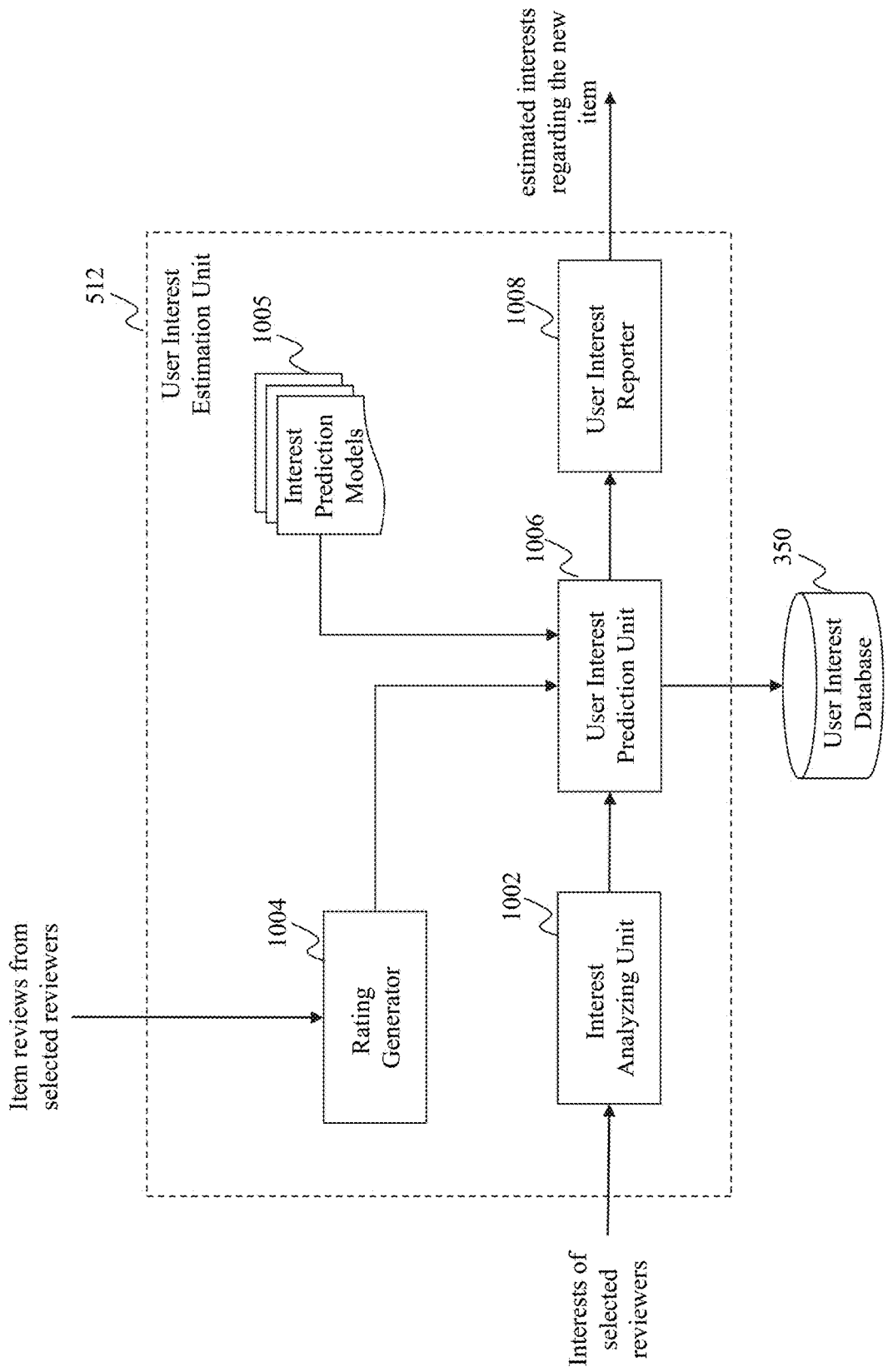
FIG. 10 illustrates an exemplary diagram of a user interest estimation unit in a CF-based interest evaluation engine, according to an embodiment of the present teaching.

FIG. 10 illustrates an exemplary diagram of a user interest estimation unit 512 in a CF-based interest evaluation engine, e.g. the CF-based interest evaluation engine 340 in FIG. 5, according to an embodiment of the present teaching. The user interest estimation unit 512 in this example includes an interest analyzing unit 1002, a rating generator 1004, a user interest prediction unit 1006, a user interest reporter 1008, and interest prediction models 1005.

The interest analyzing unit 1002 in this example receives and analyzes the interests of selected reviewers from the reviewer selection unit 506. Based on the analysis, the interest analyzing unit 1002 may determine information about the selected reviewers, including their historical interests in terms of bias and/or latent factor vectors. The interest analyzing unit 1002 sends the analyzed interest to the user interest prediction unit 1006 for estimating and predicting interests of other users.

The rating generator 1004 in this example receives item reviews regarding the new item i from the selected reviewers and generate ratings based on the reviews. In one embodiment, the reviews from the selected reviewers include ratings about the item i. In another embodiment, the reviews from the selected reviewers do not include ratings about the item i; while the rating generator 1004 may generate a rating by analyzing a review. For example, a higher rating can be generated for a review including more praising words about the item i than other reviews. The rating generator 1004 can send the ratings to the user interest prediction unit 1006 for estimating and predicting interests of other users based on the generated ratings for the selected reviewers.

The user interest prediction unit 1006 in this example estimates interests of all users regarding item i based on the obtained interests of the selected reviewers regarding the item i from the rating generator 1004 and/or the historical interests of the selected reviewers from the interest analyzing unit 1002. In accordance with one embodiment, the user interest estimation unit 512 does not include the rating generator 1004 and the interest analyzing unit 1002. The selected reviewers' reviews (e.g. ratings) and historical interests (e.g. CF model parameters) can directly go into the user interest prediction unit 1006.

The user interest prediction unit 1006 may select one of the interest prediction models 1005 stored in the user interest estimation unit 512. An interest prediction model defines how to predict interests of users based on obtained interests. For example, an interest prediction model may be a linear squares model which minimizes the MSE over the set $v_B^i$. The linear squares model solves the following problem:

$$\min_{\substack{b \in R \\ q \in R^k}} \left\{ \frac{1}{|\mathcal{V}_B^i|} \cdot \sum_{v \in \mathcal{V}_B^i} (r_{vi} - q^T P_v - b - b_v - \mu)^2 \right\}. \tag{6}$$

When the noise terms are i.i.d., an analytical solution to this minimization problem yields the following estimator:

$$(\tilde{b}_i, \tilde{Q}_i^T) = \left( \sum_{v \in \mathcal{V}_B^i} (r_{vi} - b_v - \mu) \cdot P_v'^T \right) \left( \sum_{v \in \mathcal{V}_B^i} P_v' P_v'^T \right)^{-1} = r_B^T P_B^T (P_B P_B^T)^{-1} \tag{7}$$

where $P_v'$ is a concatenated column vector $(1, P_v^T)^T$. As discussed above, for each rating $r_{ui}$ in equation (1), the unknowns are $b_i$ and $Q_i$. Therefore, based on estimated $b_i$ and $Q_i$, a rating of any user regarding item i can be estimated according to equation (2).

In case the term $\Sigma_{v \in v_B^i} P_v' P_v'^T$ in equation (7) is not invertible, an alternative estimator for $(\tilde{b}_i, \tilde{Q}_i^T)$ has the following form:

$$\left( \sum_{v \in \mathcal{V}_B^i} (r_{vi} - b_v - \mu) \cdot P_v'^T \right) \left( \lambda \cdot I + \sum_{v \in \mathcal{V}_B^i} P_v' P_v'^T \right)^{-1}. \tag{8}$$

The user interest reporter 1008 in this example generates a user interest report based on the estimated user interests or ratings from the user interest prediction unit 1006. The report includes but not limited to: information about the selected reviewers' interests regarding the new item that are obtained via request, information about the other reviewers' interests regarding the new item that are estimated by the user interest prediction unit 1006, information about the other users' interests regarding the new item that are estimated by the user interest prediction unit 1006 (if some users are not reviewers), and/or information about historical interests of users regarding existing items. In one embodiment, the user interest reporter 1008 may send the report to the publisher 330 as a response to the interest request.

Figure 11A:
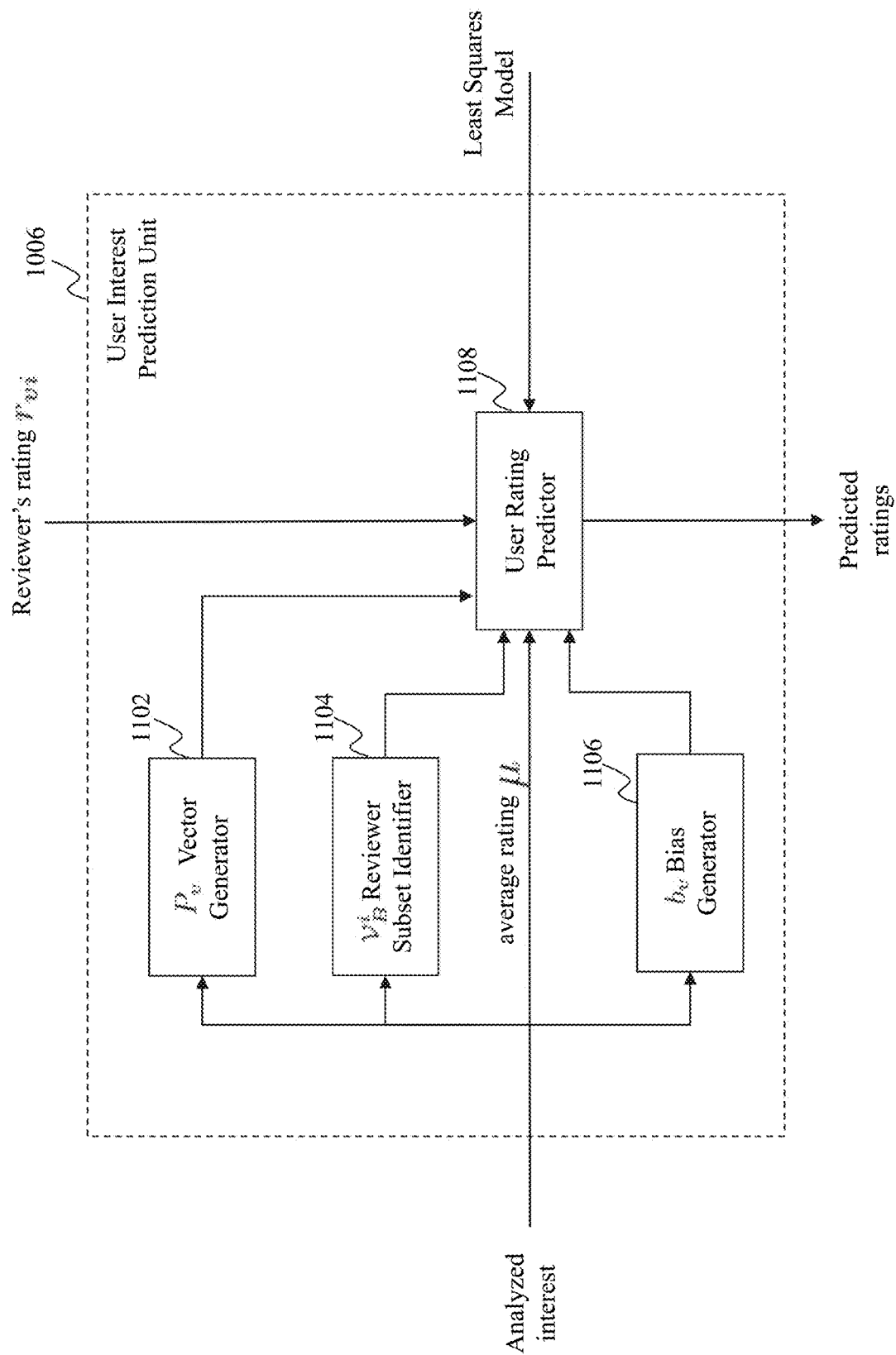
FIG. 11A illustrates an exemplary diagram of a user interest prediction unit in a user interest estimation unit, according to an embodiment of the present teaching.

The estimators according to equations (7) and/or (8) can be realized by the user interest prediction unit 1006. FIG. 11A illustrates an exemplary diagram of a user interest prediction unit 1006 in a user interest estimation unit, e.g. the user interest estimation unit 512 in FIG. 10, according to an embodiment of the present teaching. The user interest prediction unit 1006 in this example includes a $P_v$ vector generator 1102, a $v_B^i$ reviewer subset identifier 1104, a $b_v$ bias generator 1106, and a user rating predictor 1108.

The $v_B^i$ reviewer subset identifier 1104 in this example identifies the selected reviewer subset $v_B^i$ based on the analyzed interest from the interest analyzing unit 1002. The $P_v$ vector generator 1102 in this example generates vectors $P_v$ for the selected reviewers in the subset $v_B^i$, based on the analyzed interest from the interest analyzing unit 1002. The $b_v$ bias generator 1106 in this example generates bias $b_v$ for each selected reviewer v in $v_B^i$ based on the analyzed interest from the interest analyzing unit 1002. The information identified and generated at the $P_v$ vector generator 1102, the $v_B^i$ reviewer subset identifier 1104 and the $b_v$ bias generator 1106 are sent to the user rating predictor 1108 for predicting ratings of other users.

The user rating predictor 1108 in this example receives average rating μ through the analyzed interest from the interest analyzing unit 1002. The user rating predictor 1108 in this example also receives ratings $r_{vi}$ of each selected reviewer v in $v_B^i$ from the rating generator 1004 and retrieves a least squares model from the interest prediction models 1005. Based on information received, the user rating predictor 1108 estimates or predicts ratings of users for the new item i, according to the retrieved least square model and following the estimator in equation (7) or (8). The user rating predictor 1108 then sends the predicted ratings to the user interest reporter 1008 for generating a user interest report and/or stores the predicted ratings to the user interest database 350 for future use. The user rating predictor 1108 may also store other CF model parameters, e.g. latent factor vectors, in the user interest database 350 for future use.

Figure 12A:
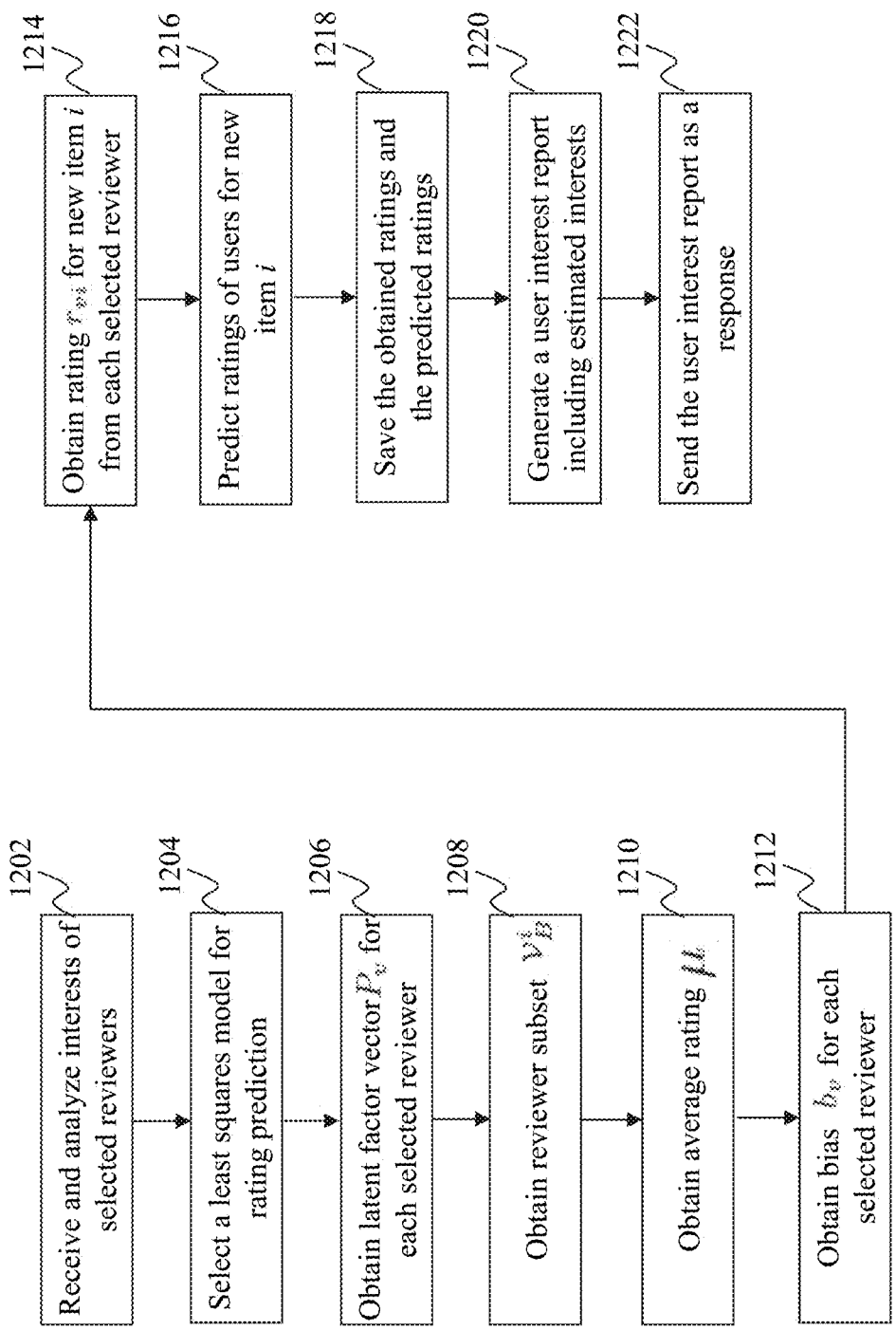
FIG. 12A is a flowchart of an exemplary process performed by a user interest estimation unit, according to an embodiment of the present teaching.

FIG. 12A is a flowchart of an exemplary process performed by a user interest estimation unit, e.g. the user interest estimation unit 512 in FIG. 10, according to an embodiment of the present teaching. In this illustrated embodiment, the noise terms are assumed to be i.i.d. according to system configuration.

Starting at 1202, interests of selected reviewers are received and analyzed. At 1204, a least squares model is selected for rating prediction. At 1206, a latent factor vector $P_v$ is obtained for each selected reviewer. At 1208, reviewer subset $v_B^i$ is obtained. At 1210, the average rating μ for all users is obtained. At 1212, bias $b_v$ for each selected reviewer is obtained.

At 1214, rating $r_{vi}$ is obtained for new item i from each selected reviewer. At 1216, ratings of users for new item i are predicted based on the obtained ratings and historical interests included in the biases and latent factor vectors. Optionally at 1218, the obtained ratings and the predicted ratings are saved in a database, e.g. the user interest database 350. At 1220, a user interest report including estimated interests is generated. At 1222, the user interest report is sent as a response to the interest request.

If the noise terms are independent but not identically distributed, an analytical solution to the minimization problem in equation (6) yields the following estimator:

$$(\tilde{b}_i, \tilde{Q}_i^T) = r_B^T C_B^{-2} P_B^T (P_B C_B^{-2} P_B^T)^{-1}, \quad (9)$$

where again, $C_B$ denotes the square root of the covariance matrix that corresponds to $\epsilon_{vi}$ for $v \in v_B^i$.

Figure 11B:
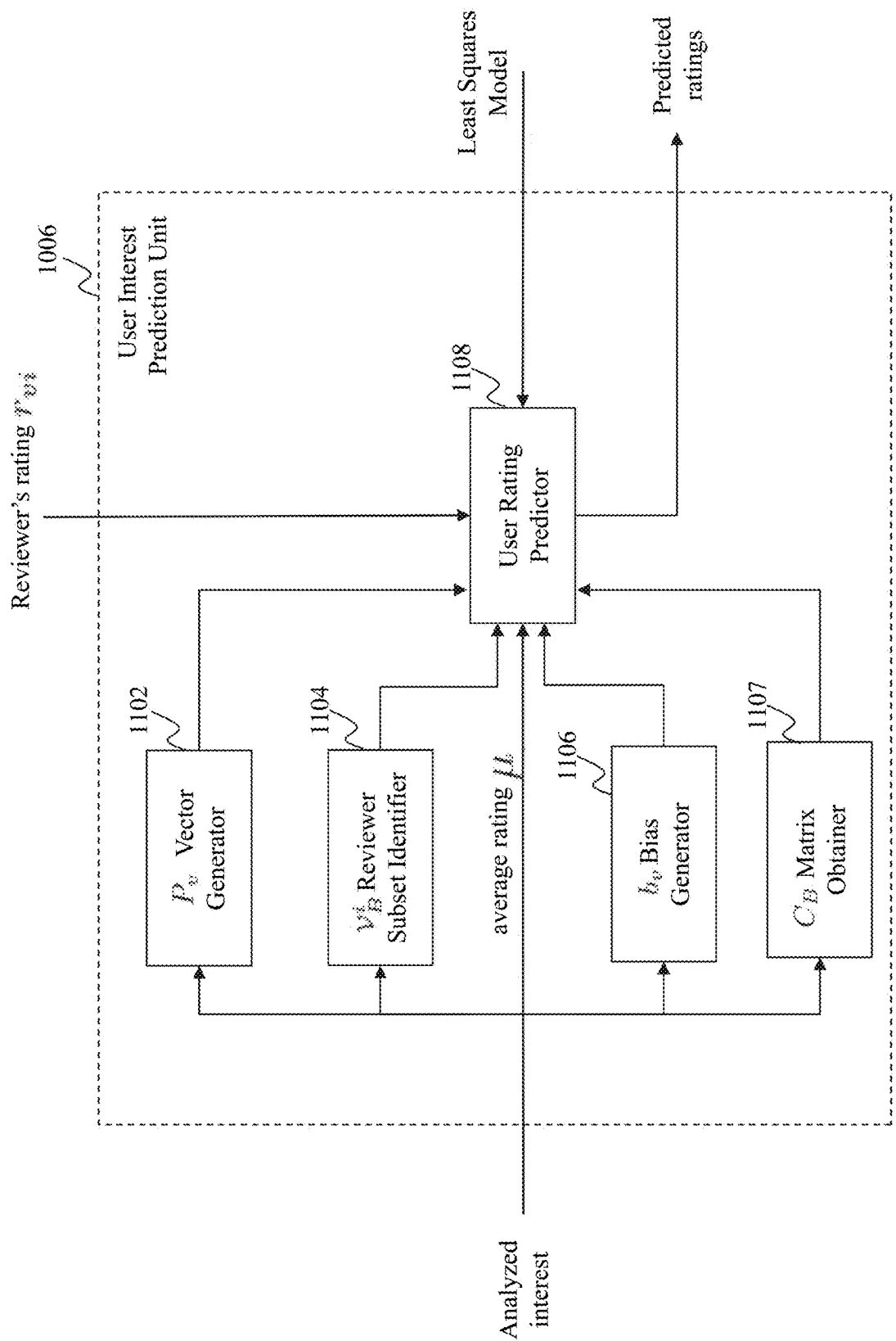
FIG. 11B illustrates another exemplary diagram of a user interest prediction unit in a user interest estimation unit, according to an embodiment of the present teaching.

The estimator according to equation (9) can be realized by the user interest prediction unit 1006, in accordance with another embodiment. FIG. 11B illustrates another exemplary diagram of a user interest prediction unit 1006 in a user interest estimation unit, e.g. the user interest estimation unit 512 in FIG. 10, according to another embodiment of the present teaching. The user interest prediction unit 1006 in this example includes the $P_v$ vector generator 1102, the $v_B^i$ reviewer subset identifier 1104, the $b_v$ bias generator 1106, a $C_B$ matrix obtainer 1107, and the user rating predictor 1108.

The $v_B^i$ reviewer subset identifier 1104 in this example identifies the selected reviewer subset $v_B^i$ based on the analyzed interest from the interest analyzing unit 1002. The $P_v$ vector generator 1102 in this example generates vectors $P_v$ for the selected reviewers in the subset $v_B^i$, based on the analyzed interest from the interest analyzing unit 1002. The $b_v$ bias generator 1106 in this example generates bias $b_v$ for each selected reviewer $v_B^i$ in based on the analyzed interest from the interest analyzing unit 1002. The $C_B$ matrix obtainer 1107 in this example obtains matrix $C_B$ based on the analyzed interest from the interest analyzing unit 1002. As discussed above, the reviewer determiner 750 may also send information about system configuration including $C_B$ that can be analyzed by the interest analyzing unit 1002 and included in the analyzed interest to the user interest estimation unit 512. The information identified and generated at the $P_v$ vector generator 1102, the $v_B^i$ reviewer subset identifier 1104, the $b_v$ bias generator 1106 and the $C_B$ matrix obtainer 1107 are sent to the user rating predictor 1108 for predicting ratings of other users.

The user rating predictor 1108 in this example receives average rating μ through the analyzed interest from the interest analyzing unit 1002. The user rating predictor 1108 in this example also receives ratings $r_{vi}$ of each selected reviewer v in $v_B^i$ from the rating generator 1004 and retrieves a least squares model from the interest prediction models 1005. Based on information received, the user rating predictor 1108 estimates or predicts ratings of users for the new item i, according to the retrieved least square model and following the estimator in equation (9). The user rating predictor 1108 then sends the predicted ratings to the user interest reporter 1008 for generating a user interest report and/or stores the predicted ratings to the user interest database 350 for future use.

Figure 12B:
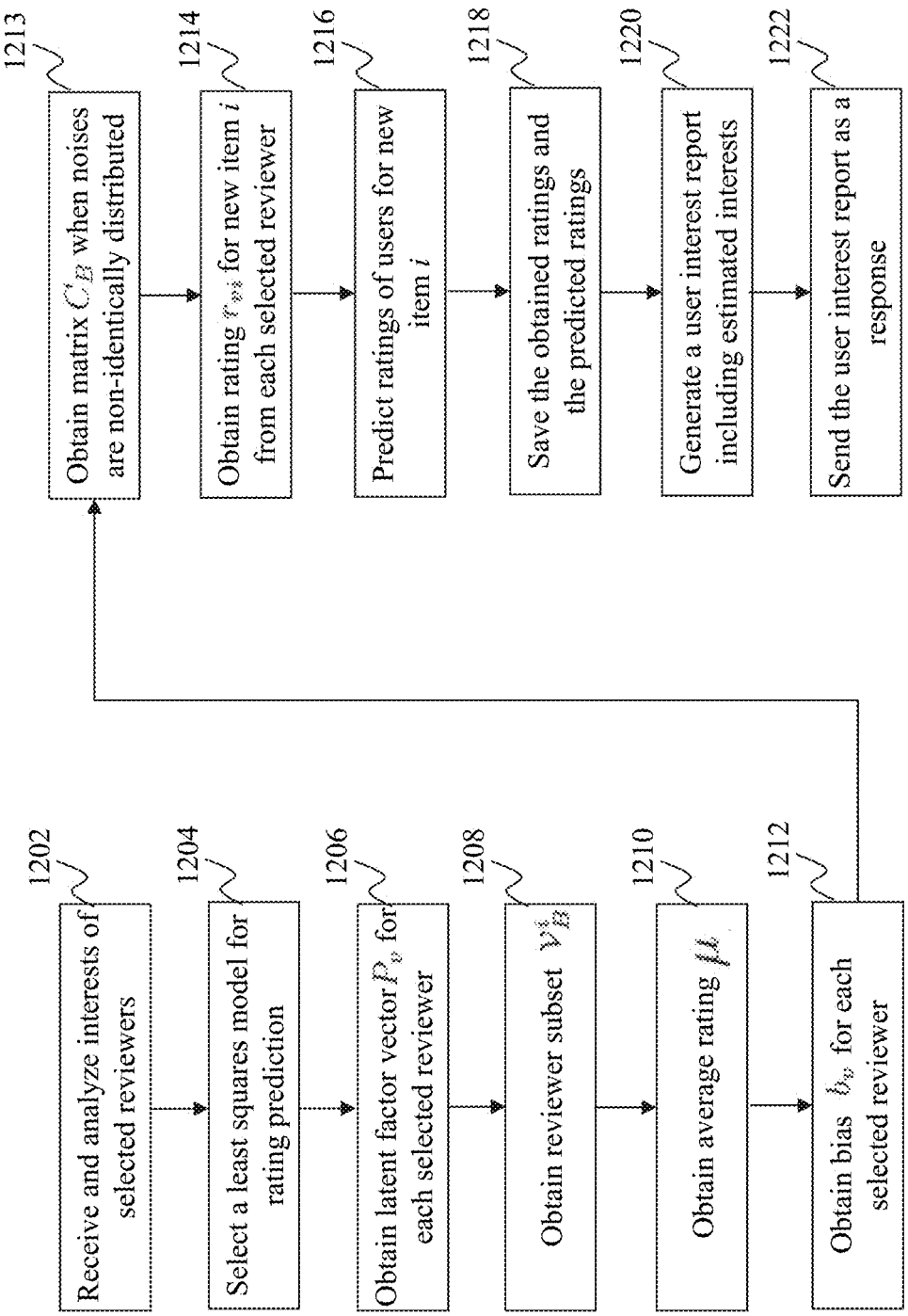
FIG. 12B is a flowchart of another exemplary process performed by a user interest estimation unit, according to an embodiment of the present teaching.

FIG. 12B is a flowchart of an exemplary process performed by a user interest estimation unit, e.g. the user interest estimation unit 512 in FIG. 10, according to an embodiment of the present teaching. In this illustrated embodiment, the noise terms are assumed to be independent but not identically distributed according to system configuration.

Starting at 1202, interests of selected reviewers are received and analyzed. At 1204, a least squares model is selected for rating prediction. At 1206, a latent factor vector $P_v$ is obtained for each selected reviewer. At 1208, reviewer subset $v_B^i$ is obtained. At 1210, the average rating μ for all users is obtained. At 1212, bias $b_v$ for each selected reviewer is obtained. At 1213, matrix $C_B$ is obtained when noises are non-identically distributed.

At 1214, rating $r_{vi}$ is obtained for new item i from each selected reviewer. At 1216, ratings of users for new item i are predicted based on the obtained ratings and historical interests included in the biases and latent factor vectors. Optionally at 1218, the obtained ratings and the predicted ratings are saved in a database, e.g. the user interest database 350. At 1220, a user interest report including estimated interests is generated. At 1220, the user interest report is sent as a response to the interest request.

It can be understood that other interest prediction models can be used to generate other estimators for $(\tilde{b}_i, \tilde{Q}_i^T)$. For example, a mean rating predictor can be used to estimate $b_i$ and $Q_i$ as $(\tilde{b}_i, \tilde{Q}_i^T) = (0, 0T)$. In another example, an item bias predictor can be used to estimate $b_i$ and $Q_i$ as the following:

$$(\tilde{b}_i, \tilde{Q}_i^T) = \left( \frac{1}{|\mathcal{V}_B^i|} \cdot \sum_{v \in \mathcal{V}_B^i} (r_{vi} - b_v) - \mu, 0^T \right).$$

In yet another example, a similarity based predictor can be used to yield the following estimator for $b_i$ and $Q_i$:

$$\tilde{b}_i = \frac{1}{|\mathcal{V}_B^i|} \cdot \sum_{v \in \mathcal{V}_B^i} (r_{vi} - b_v) - \mu,$$

$$\tilde{Q}_i = \frac{1}{|\{v \in \mathcal{V}_B^i \mid r_{vi} \geq \gamma\}|} \cdot \sum_{v \in \mathcal{V}_B^i \mid r_{vi} \geq \gamma} P_v,$$

where $\gamma$ is a predetermined threshold (e.g. 4 or 5).

Figure 13:
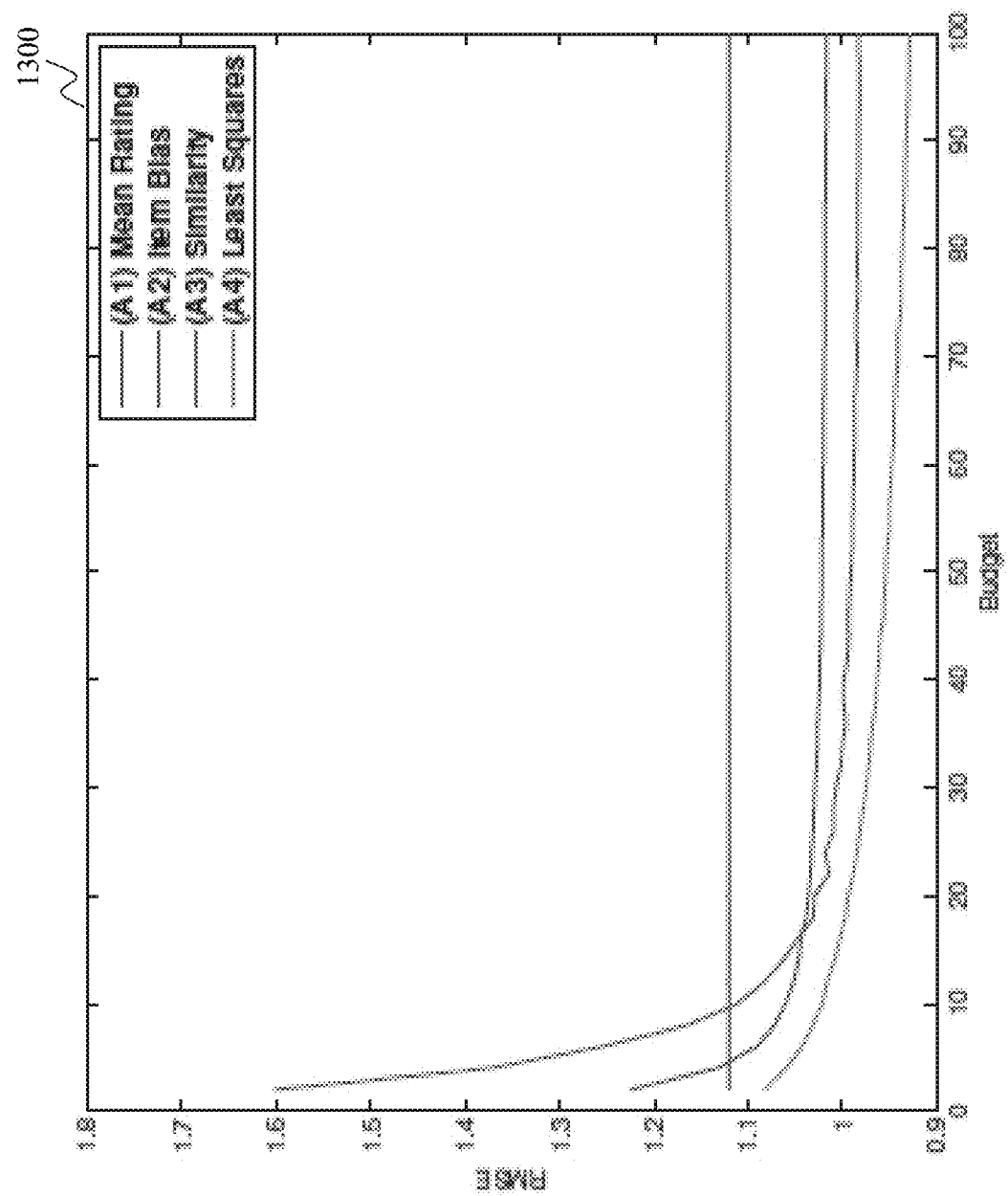
FIG. 13 illustrates a comparison of performances of different interest prediction models, according to various embodiments of the present teaching.

FIG. 13 illustrates a comparison 1300 of performances of different interest prediction models in terms of Root Mean Squared Error (RMSE), according to various embodiments of the present teaching. In this example, 300 movies were selected arbitrarily. For each of these movies, B reviewers (B=2, 4 . . . 100) are selected and four types of interest prediction models are applied for comparison. As shown in FIG. 13, the least squares predictor (A4) outperforms the other predictors, in terms of RMSE.

Figure 14:
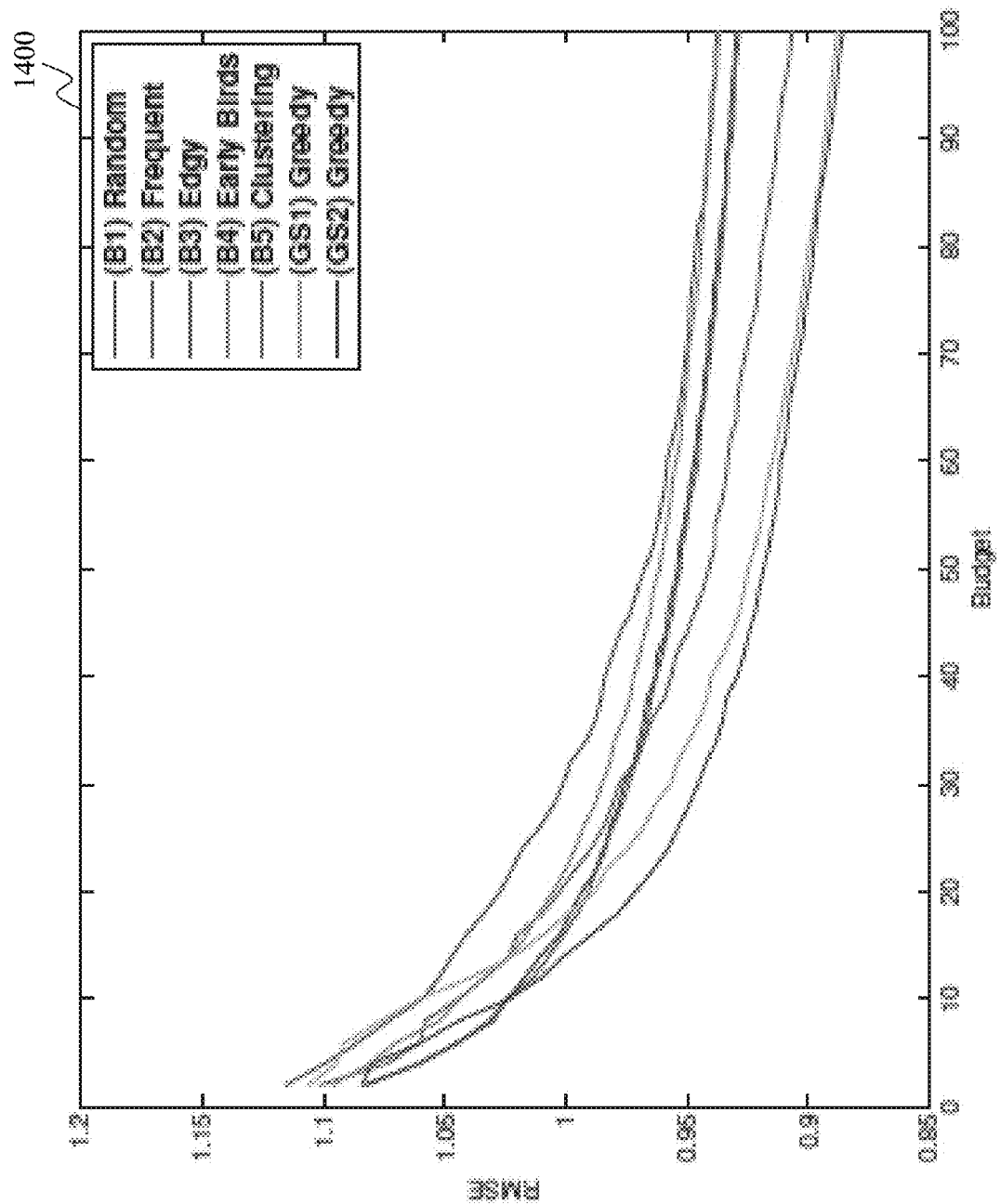
FIG. 14 illustrates a comparison of performances of different reviewer selection methods, according to various embodiments of the present teaching.

FIG. 14 illustrates a comparison 1400 of performances of different reviewer selection methods in terms of RMSE, according to various embodiments of the present teaching. In this example, 300 movies were selected arbitrarily. For each of these movies, five baseline selection methods discussed above and the two proposed methods Greedy Selection 1 (GS1) and Greedy Selection 2 (GS2) are applied to select a subset of B reviewers (B=2, 4 . . . 100) for comparison. The estimator is least squares predictor regardless how the selection was made, since it outperforms other predictors. As shown in FIG. 14, the proposed two methods GS1 and GS2 outperform the other baseline selection methods for almost any budget B, in terms of RMSE. In this example, method GS2, which accounts for independent yet not identically distributed noises, surpasses method GS1 when budget B is lower than 60. It can be understood that each interest prediction model in FIG. 13 can be applied together with any of the reviewer selection methods shown in FIG. 14.

Figure 15:
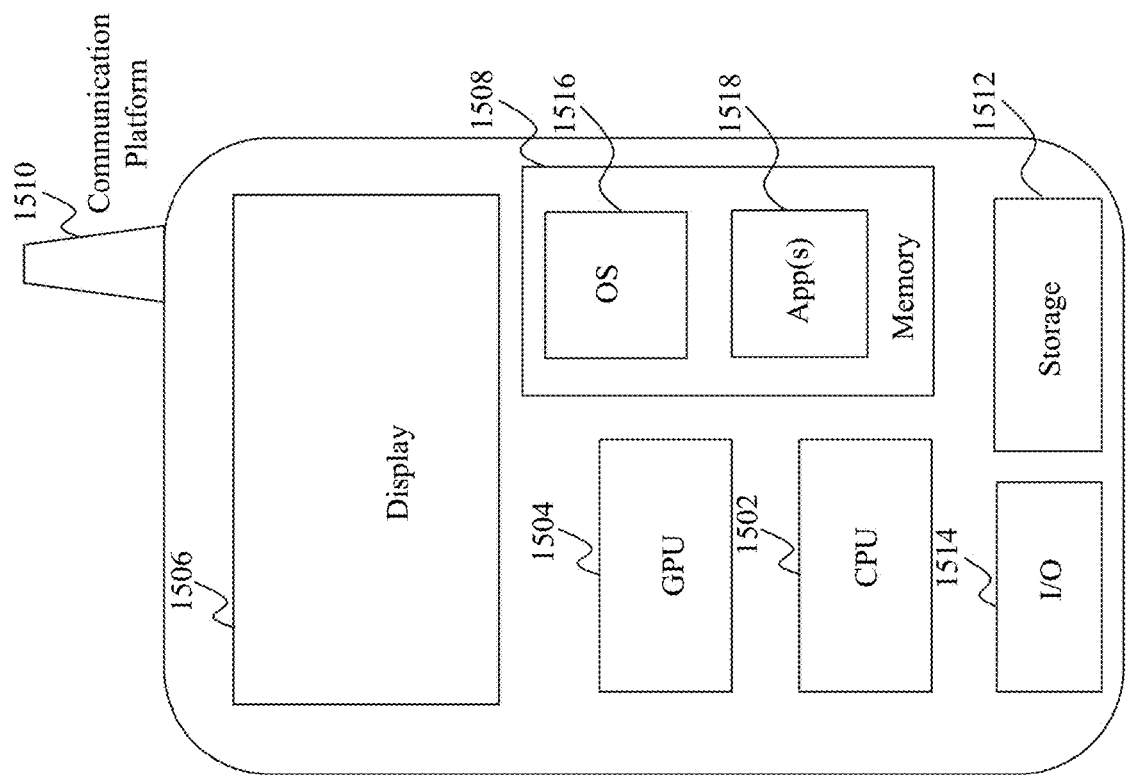
FIG. 15 depicts a general mobile device architecture on which the present teaching can be implemented.

FIG. 15 depicts a general mobile device architecture on which the present teaching can be implemented. In this example, a device of the user 310 is a mobile device 1500, including but is not limited to, a smart phone, a tablet, a music player, a handled gaming console, a GPS receiver. The mobile device 1500 in this example includes one or more central processing units (CPUs) 1502, one or more graphic processing units (GPUs) 1504, a display 1506, a memory 1508, a communication platform 1510, such as a wireless communication module, storage 1512, and one or more input/output (I/O) devices 1519. Any other suitable component, such as but not limited to a system bus or a controller (not shown), may also be included in the mobile device 1500. As shown in FIG. 15, a mobile operating system 1516, e.g., iOS, Android, Windows Phone, etc., and one or more applications 1518 may be loaded into the memory 1508 from the storage 1512 in order to be executed by the CPU 1502. The applications 1518 may include a web browser or any other suitable mobile search apps. Execution of the applications 1518 may cause the mobile device 1500 to perform some processing as described before. User inputs are received via the I/O devices 1514 and sent to the publisher 330 via the communication platform 1510.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 16:
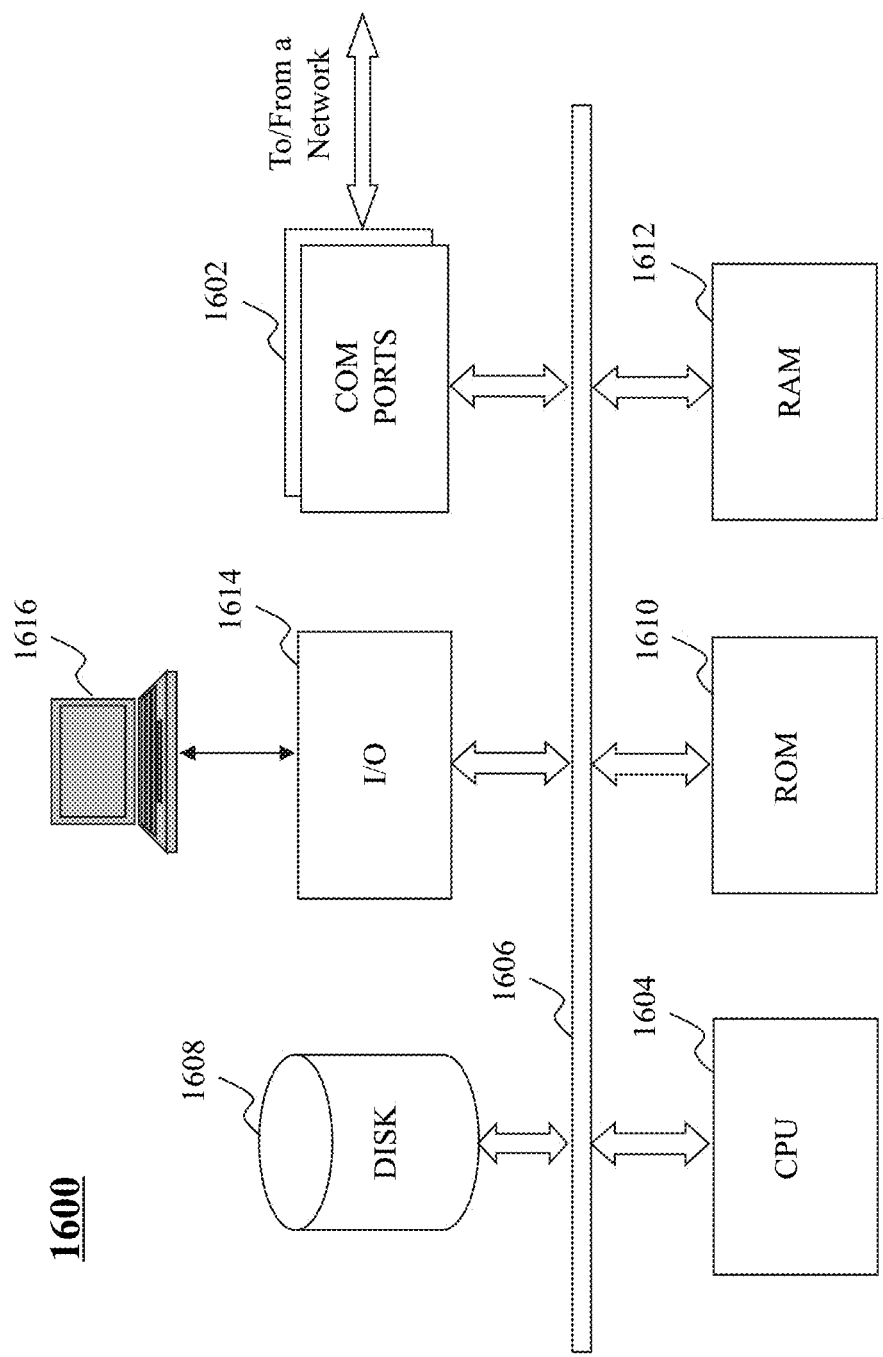
FIG. 16 depicts a general computer architecture on which the present teaching can be implemented.

FIG. 16 depicts a general computer architecture on which the present teaching can be implemented and has a functional block diagram illustration of a computer hardware platform that includes user interface elements. The computer may be a general-purpose computer or a special purpose computer. This computer 1600 can be used to implement any components of the user interest estimation architecture as described herein. Different components of the system, e.g., as depicted in FIGS. 3 and 4, can all be implemented on one or more computers such as computer 1600, via its hardware, software program, firmware, or a combination thereof. Although only one such computer is shown, for convenience, the computer functions relating to user interest estimation may be implemented in a distributed fashion on a number of similar platforms, to distribute the processing load.

The computer 1600, for example, includes COM ports 1602 connected to and from a network connected thereto to facilitate data communications. The computer 1600 also includes a CPU 1604, in the form of one or more processors, for executing program instructions. The exemplary computer platform includes an internal communication bus 1606, program storage and data storage of different forms, e.g., disk 1608, read only memory (ROM) 1610, or random access memory (RAM) 1612, for various data files to be processed and/or communicated by the computer, as well as possibly program instructions to be executed by the CPU 1604. The computer 1600 also includes an I/O component 1614, supporting input/output flows between the computer and other components therein such as user interface elements 1616. The computer 1600 may also receive programming and data via network communications.

Hence, aspects of the method of user interest estimation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for estimating interests, the method comprising:
   generating a historical interest vector for each of a plurality of users with respect to one or more existing pieces of information;
   identifying a similarity/dissimilarity between the plurality of users based on the generated historical interest vectors;
   selecting a first group of users from the plurality of users, the selecting including:
      determining a plurality of user sets, wherein each user set comprises a same predetermined number of users,
      generating a plurality of function values by calculating an objective function based on vectors for each of the plurality of user sets,
      selecting a user set from the plurality of user sets so that the function value generated based on the user set is least among the plurality of function values, and
      iteratively eliminating a user from the user set based on the generated historical interest vectors of other users in the user set minimizing the objective function over a second group of users;
   detecting interactions of each user in the selected first group of users with respect to a new piece of information to obtain interest of the user in the new piece of information; and
   generating estimated interests of the second group of users with respect to the new piece of information based on the detected interactions.

2. The method of claim 1, wherein a number of users included in the first group of users is predetermined.

3. The method of claim 1, wherein the objective function represents an expected mean square error between the estimated interests and real interests of the second group of users with respect to the new piece of information.

4. The method of claim 1, wherein selecting the first group of users from the plurality of users comprises:
   initializing the user set to comprise the plurality of users;
   generating a matrix which initially comprises a plurality of columns, wherein each column of the matrix corresponds to a generated vector for one of the users in the user set;
   generating a plurality of candidate matrices each of which corresponding to a user in the user set and generated by removing the column corresponding to the user from the matrix;
   generating a plurality of function values by calculating the objective function based on each of the plurality of candidate matrices;
   selecting one of the plurality of candidate matrices so that the function value generated based on the selected candidate matrix is least among the plurality of function values;
   updating the matrix with the selected candidate matrix; and
   updating the user set by removing the user corresponding to the selected candidate matrix from the user set.

5. The method of claim 1, wherein the estimated interests of the plurality of users are generated based on a least squares model.

6. The method of claim 1, further comprising:
identifying a user other than the plurality of users; and
estimating interest of the user based on the obtained interests of the first group of users.

7. The method of claim 1, wherein the first group of users is distinct with respect to the second group of users.

8. The method of claim 1, wherein the second group of users is different than the first group of users.

9. A system, including a storage, and a communication platform connected to a network for estimating interests, the system comprising:
at least one processor configured to
generate a historical interest vector for each of the plurality of users with respect to one or more existing pieces of information;
identify a similarity/dissimilarity between the plurality of users based on the generated historical interest vectors
select a first group of users from the plurality of users, the selecting including:
determining a plurality of user sets, wherein each user set comprises a same predetermined number of users,
generating a plurality of function values by calculating an objective function based on vectors for each of the plurality of user sets,
selecting a user set from the plurality of user sets so that the function value generated based on the user set is least among the plurality of function values, and
iteratively eliminating a user from the user set based on the generated historical interest vectors of other users in the user set minimizing the objective function over a second group of users;
detect interactions of each user in the selected first group of users with respect to a new piece of information to obtain interest of the user in the new piece of information; and
generate estimated interests of the second group of users with respect to the new piece of information based on the detected interactions.

10. The system of claim 9, wherein a number of users included in the first group of users is predetermined.

11. The system of claim 9, wherein the objective function represents an expected mean square error between the estimated interests and real interests of the second group of users with respect to the new piece of information.

12. The system of claim 9, wherein the at least one processor is further configured to:
initialize the user set to comprise the plurality of users;
generate a matrix which initially comprises a plurality of columns, wherein each column of the matrix corresponds to a generated vector for one of the users in the user set;
generate a plurality of candidate matrices each of which corresponding to a user in the user set and generated by removing the column corresponding to the user from the matrix;
generate a plurality of function values by calculating the objective function based on each of the plurality of candidate matrices;
select one of the plurality of candidate matrices so that the function value generated based on the selected candidate matrix is least among the plurality of function values;
update the matrix with the selected candidate matrix; and
update the user set by removing the user corresponding to the selected candidate matrix from the user set.

13. The system of claim 9, wherein the estimated interests of the plurality of users are generated based on a least squares model.

14. The system of claim 9, wherein the at least one processor is further configured to:
identify a user other than the plurality of users; and
estimate interest of the user based on the obtained interests of the first group of users.

15. A machine-readable tangible and non-transitory medium having information recorded thereon for estimating interests, wherein the information, when read by the machine, causes the machine to perform the following:
generating a historical interest vector for each of a plurality of users with respect to one or more existing pieces of information;
identifying a similarity/dissimilarity between the plurality of users based on the generated historical interest vectors;
selecting a first group of users from the plurality of users, the selecting including:
determining a plurality of user sets, wherein each user set comprises a same predetermined number of users,
generating a plurality of function values by calculating an objective function based on vectors for each of the plurality of user sets,
selecting a user set from the plurality of user sets so that the function value generated based on the user set is least among the plurality of function values, and
iteratively eliminating a user from the user set based on the generated historical interest vectors of other users in the user set minimizing the objective function over a second group of users;
detecting interactions of each user in the selected first group of users with respect to a new piece of information to obtain interest of the user in the new piece of information; and
generating estimated interests of the second group of users with respect to the new piece of information based on the detected interactions.

16. The medium of claim 15, wherein a number of users included in the first group of users is predetermined.

17. The medium of claim 15, wherein the objective function represents an expected mean square error between the estimated interests and real interests of the second group of users with respect to the new piece of information.

18. The medium of claim 15, wherein selecting the first group of users from the plurality of users comprises:
initializing the user set to comprise the plurality of users;
generating a matrix which initially comprises a plurality of columns, wherein each column of the matrix corresponds to a generated vector for one of the users in the user set;
generating a plurality of candidate matrices each of which corresponding to a user in the user set and generated by removing the column corresponding to the user from the matrix;
generating a plurality of function values by calculating the objective function based on each of the plurality of candidate matrices;
selecting one of the plurality of candidate matrices so that the function value generated based on the selected candidate matrix is least among the plurality of function values;

updating the matrix with the selected candidate matrix; and updating the user set by removing the user corresponding to the selected candidate matrix from the user set.

19. The medium of claim 15, wherein the estimated interests of the plurality of users are generated based on a least squares model.

20. The medium of claim 15, the information, when read by the machine, further causes the machine to perform the following:

identifying a user other than the plurality of users; and estimating interest of the user based on the obtained interests of the first group of users.

\* \* \* \* \*